(12) United States Patent
Ludwig

(10) Patent No.: US 8,734,732 B2
(45) Date of Patent: May 27, 2014

(54) CHEMICAL SYNTHESIS AND ANALYSIS VIA INTEGRATED OR SEQUENTIAL PHOTOCHEMICAL AND ELECTROCHEMICAL PROCESSES FOR USE IN MICROFLUIDIC, LAB-ON-A-CHIP, AND GREEN-CHEMISTRY APPLICATIONS

(75) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 0 days.

(21) Appl. No.: 12/931,867

(22) Filed: Feb. 11, 2011

(65) Prior Publication Data

US 2011/0194994 A1    Aug. 11, 2011

Related U.S. Application Data

(60) Provisional application No. 61/303,577, filed on Feb. 11, 2010.

(51) Int. Cl.
*G01N 15/06* (2006.01)

(52) U.S. Cl.
USPC ............ 422/503; 422/50; 422/68.1; 422/502; 422/129; 436/43; 436/63; 436/174; 436/180

(58) Field of Classification Search
USPC ............... 422/50, 68.1, 502, 503; 436/43, 63, 436/174, 180
See application file for complete search history.

(56) References Cited

U.S. PATENT DOCUMENTS

| | | | |
|---|---|---|---|
| 6,623,860 B2 * | 9/2003 | Hu et al. ................... | 428/411.1 |
| 2002/0012616 A1 * | 1/2002 | Zhou et al. ................... | 422/130 |

\* cited by examiner

*Primary Examiner* — Brian J Sines
(74) *Attorney, Agent, or Firm* — Procopio, Cory, Hargreaves & Savitch LLP

(57) ABSTRACT

A microfluidic system comprising a plurality of photochemical reaction stages, the microfluidic system comprising a computational processor, a plurality of electrically-controllable photochemical reaction stages, and a series of controllable interconnections for connecting the photochemical reaction stages. In an implementation, the computational processor controls the plurality of electrically-controllable photochemical reaction stages and the controllable interconnections so as to implement a multi-step photochemical synthesis function.

11 Claims, 23 Drawing Sheets

Reaction Network or Multi-stage Architecture

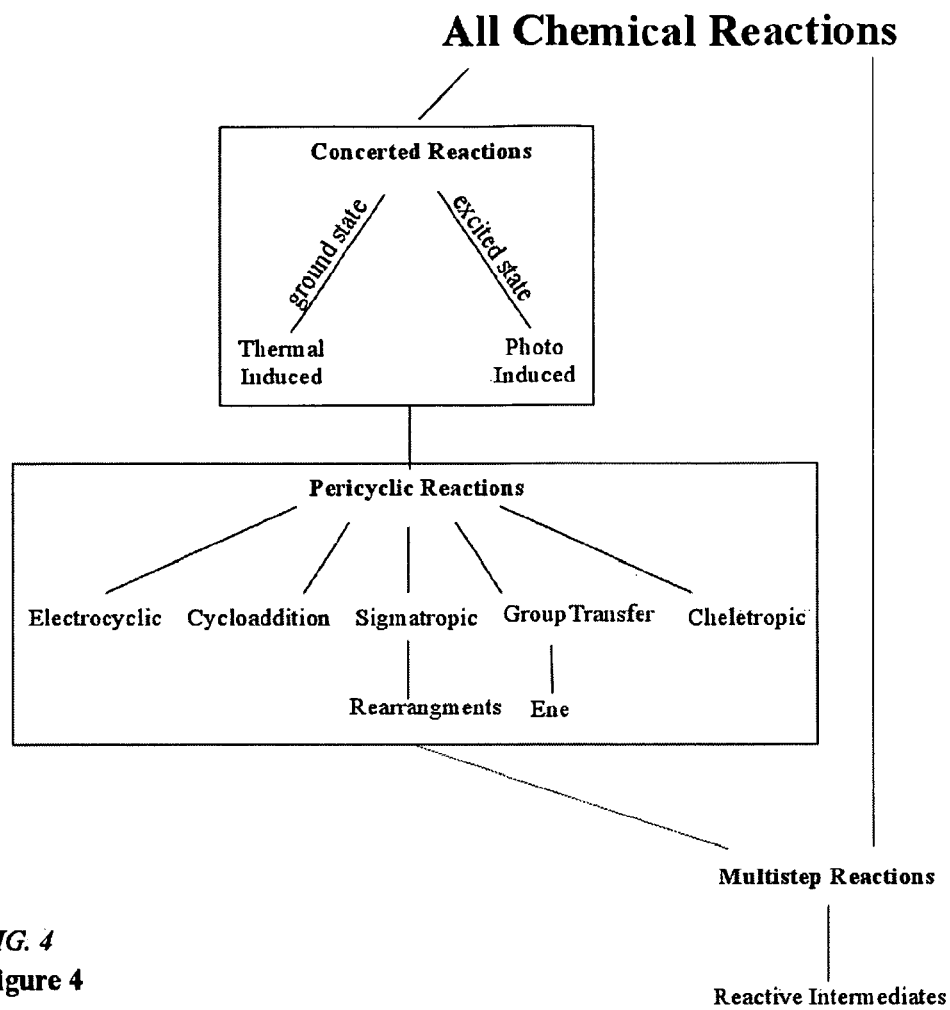
*FIG. 4*
Figure 4
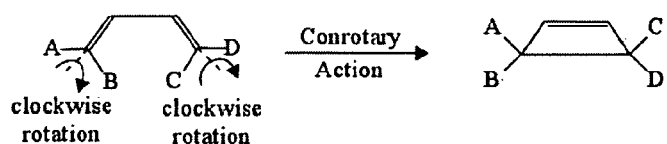
Figure 5a
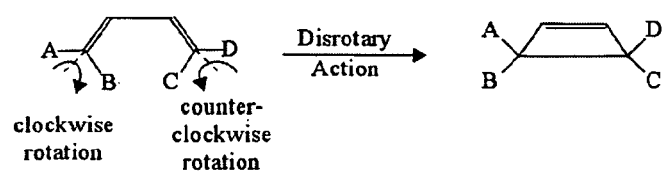
Figure 5b

| Reaction | Initiation | Mechnism | 4n system | 4n+2 system |
|---|---|---|---|---|
| Electrocyclic | Ground State | conrotation | allowed | forbidden |
| | | disrotation | forbidden | allowed |
| Cycloaddition | Ground State | supra-antara | allowed | forbidden |
| | | supra-supra | forbidden | allowed |
| Sigmatropic | Ground State | supra-antara | allowed | forbidden |
| | | supra-supra | forbidden | allowed |
| Group Transfer | Ground State | supra-antara | allowed | forbidden |
| | | supra-supra or antara-antara | forbidden | allowed |
| Cheletropic | Ground State | conrotation | nonlinear allowed | linear allowed |
| | | disrotation | linear allowed | nonlinear allowed |
| Electrocyclic | Excited State | disrotation | allowed | forbidden |
| | | conrotation | forbidden | allowed |
| Cycloaddition | Excited State | supra-supra | allowed | forbidden |
| | | supra-antara | forbidden | allowed |
| Sigmatropic | Excited State | supra-supra | allowed | forbidden |
| | | supra-antara | forbidden | allowed |
| Group Transfer | Excited State | supra-supra or antara-antara | allowed | forbidden |
| | | supra-antara | forbidden | allowed |
| Cheletropic | Excited State | disrotation | nonlinear allowed | linear allowed |
| | | conrotation | linear allowed | nonlinear allowed |

FIG. 6

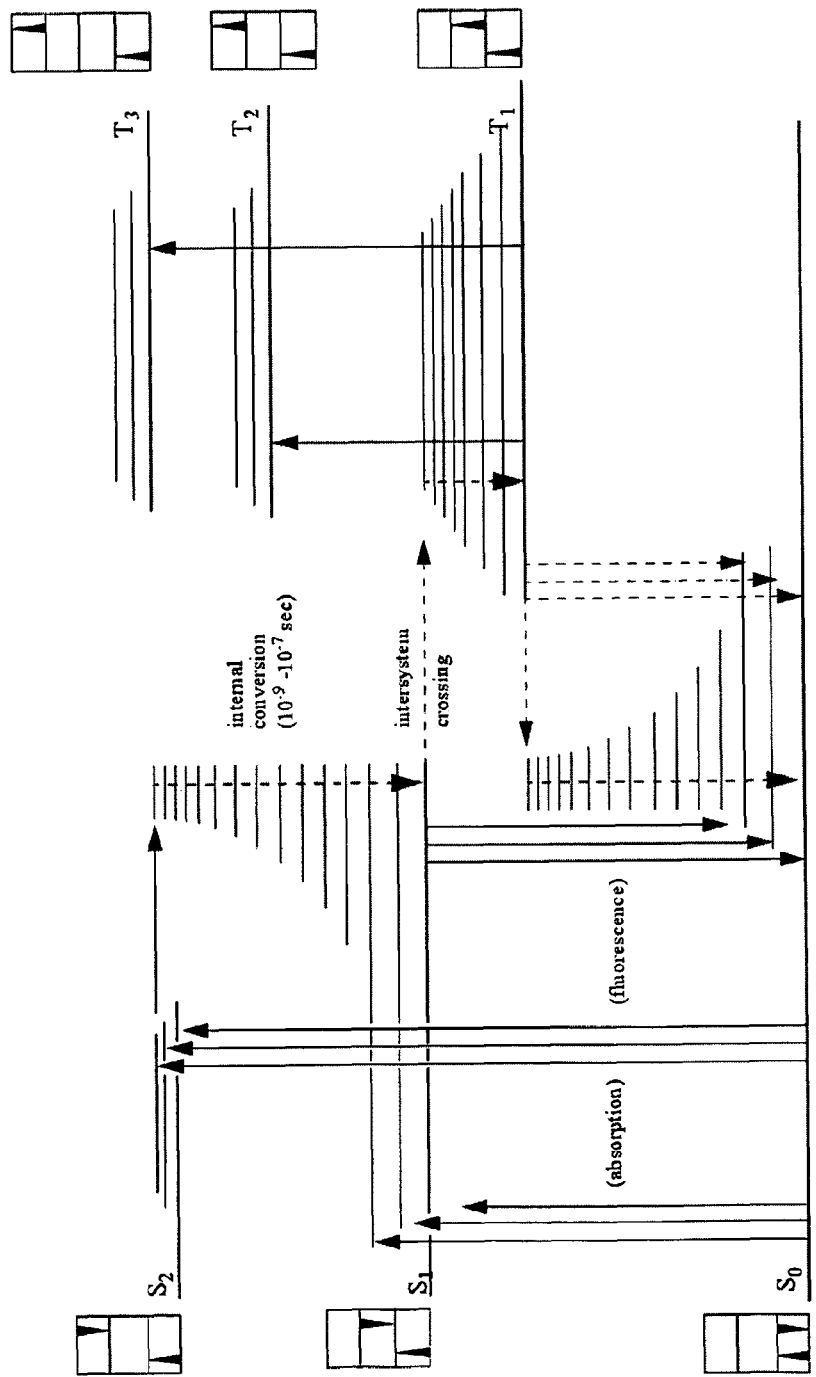
FIG. 11  Schematic representation of various excited electronic states of an organic molecule, their energy level relationships, and interconversion processes.

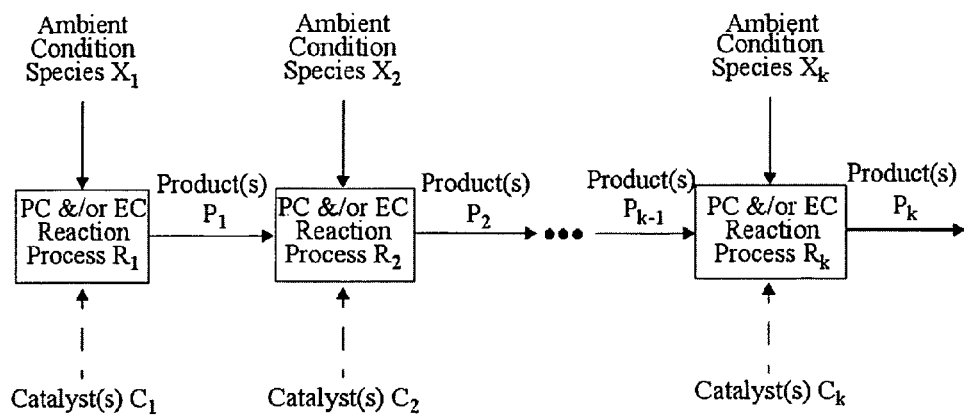
FIG. 16  Reaction Network or Multi-stage Architecture
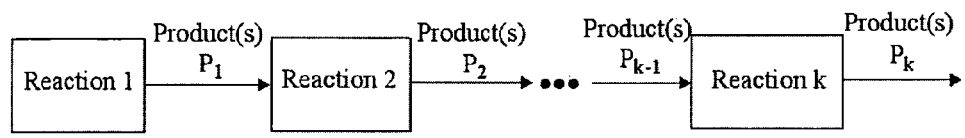
FIG. 17  Telescoping Reaction
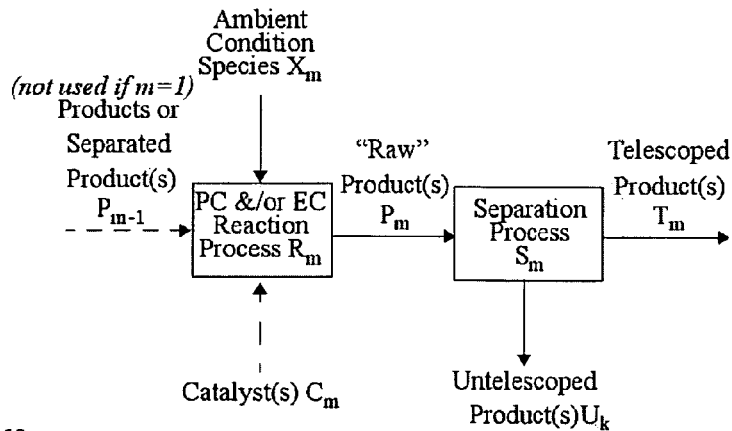
FIG. 18

FIG. 21 Classification of various microheterogeneous systems

US 8,734,732 B2

CHEMICAL SYNTHESIS AND ANALYSIS VIA INTEGRATED OR SEQUENTIAL PHOTOCHEMICAL AND ELECTROCHEMICAL PROCESSES FOR USE IN MICROFLUIDIC, LAB-ON-A-CHIP, AND GREEN-CHEMISTRY APPLICATIONS

CROSS-REFERENCE TO RELATED APPLICATIONS

Pursuant to 35 U.S.C. §119(e), this application claims benefit of priority from Provisional U.S. Patent application Ser. No. 61/303,577, filed Feb. 11, 2010, the contents of which are incorporated by reference.

TECHNICAL FIELD OF THE INVENTION

The present invention relates generally to chemical synthesis, synthons, chemical analysis, microfluidics, lab-on-a-chip, Total Micro-Analysis Systems, chemical analysis systems, photochemistry, electrochemistry, flow-reaction systems, and green chemistry, and in particularly to technologies wherein a plurality of one or more of photochemical, electrochemical, and photophysics processes are simultaneously or sequentially used in ways advantageous to microfluidics, lab-on-a-chip, Micro Total Analysis Systems, chemical analysis systems, and green chemistry.

COPYRIGHT & TRADEMARK NOTICES

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

Atomic Orbitals, Molecular Orbitals, and Bonding In a simplistic view, atomic orbitals are the domain of electrons orbiting around the nucleolus of atoms. Atomic orbitals and the bonds between them comprise the basis for the grand majority of chemical compounds. Pluralities of bonded atoms form molecules, and the bonds among orbitals create opportunities for molecular-scale orbitals. In many kinds of these an electron is no longer bound to a single atom but (in the viewpoint of quantum chemistry) is probabilistically shared among two or more atoms in the molecule. In some cases, molecular orbital configurations allow an electron to be shared by most or all of the atoms in the molecule.

FIG. 1, adapted from FIG. 3.12 of [1], depicts some important types of molecular orbitals as can be formed from p-orbitals of constituent atoms and that are of relevance to chemical reactions. These include the π-bond (important in the sharing of electrons among atoms for example in aromatic compounds), Walsh ("banana") bonds (important in strained molecules such as small heterocycles), and σ-bonds (which often form the skeleton of many organic compounds and are also at times unusual players in various types chemical reactions).

For an electron to reside in a particular molecular orbital it must have, but the dictates of quantum mechanics, a particular associated energy. Quantum effects prevent more than one electron in an electron system from having the same state. State includes the spin of the electron, and the binary nature of spin results in many electrons sharing the same basic orbital situation in either pairs or individually. FIG. 2, adapted from FIG. 3.13 of [1], depicts a representative diagram of typical molecular orbital energy levels, the energy increasing as an electron migrates vertically within this hierarchy. In the ground (lowest energy), the electrons pile into the molecular orbitals with the lowest available energy state, and thus occupy the lowest possible portions of this hierarchy.

Usually to have a chemical reaction, bonds are broken, made, or both (albeit sometimes they are arguably shuffled). A new bond requires an energy to form, and breaking a bond requires energy to free an electron from its bond so that it is free to have a different future. The energy used to form and break bonds can be provided thermally, but also can be delivered photochemically, electrochemically, and by other means such as cavation processes in sonochemistry. Energy is proportional to photon frequency and thus inversely proportional to photon wavelength. Thus a plot of photon energy versus wavelength is a "y=C/x" hyperbolic curve. Since points on such a curve relate energy to wavelength, by associating bond energies to the corresponding energy point on the curve, the maximum wavelength for the bond can be graphically identified. FIG. 3 depicts the energy of various types of bounds between example elemental atoms and wavelengths required to break various bonds. Visible light lies in the range of 500-700 nm, with wavelengths less than 500 nm forming the ultraviolet and wavelengths less than ~250 nm forming the "far ultraviolet."

High-power LEDs are available in the visible spectrum and at ultraviolet wavelengths. Recently "far ultraviolet" LEDs have also become commercially available, for example including those going down to 240 nm or below (such as those available from Sensor Electronic Technology, Inc., 1195 Atlas Road, Columbia, S.C., 29209, 803-647-9757. On the other side of the visible light range, infrared LEDs are commercially available that go to wavelengths as long as 2400 nm, for example those available from Laser 2000 GMbH, Argelsrieder Feld 14, D-82234, Wessling, FRG, +49-8153-405-0. Thus the curve depicted in FIG. 3 is useful for relating photochemical synthesis opportunities to commercially available visible light LEDs, ultraviolet LEDs, far-ultraviolet LEDs, and infrared LEDs. Except for triple bonds and carbon-oxygen bonds, a very large number of bond energies are within the reach of photostimulation by commercially available LEDs. Further these LEDs are physically very small, consume low power, and are readily installed in a wide range of physical arrangements. Thus, in an inventive step provided for by the invention, the resulting situation is thus well suited for microfluidics and lab-on-a-chip environments performing chemical synthesis, and the very-to-extremely small physical scale of such devices allow the delivery of high photon fluxes to small volumes of liquids, gases, and solids in various situations. Further, LEDs also behave as wavelength-selective photodiodes. Thus, in an inventive step provided for by the invention, LEDs can be adapted for use as light sensors, albeit with special electronics for working with photovoltages, photocurrents, photo-induced space-charge effects, and non-bandpass aspects of LED sensitivity with respect to incident light wavelength. The invention thus further provides microfluidics and lab-on-a-chip environments with capabilities for photochemical and photophysics analysis In many circumstances energy, as well as electrons (as useful for electron-transfer reactions and umpoled reactions) can be provided by electrodes immersed in various types of materials and solvents (including non-aqueous solvents). In an inventive step provided for my the invention, such electrodes can be rendered in very small physical size for use in microfluidics and lab-on-a-chip environments, and thus the invention further provides microfluidics and lab-on-a-chip environments with electrochemical synthesis and analysis.

Further, photochemical and electrochemical processes generate excited states and reactive intermediates. The invention leverages these to further provide for excited states and reactive intermediates to be used in sequence or combination for chemical synthesis, analysis, or both. Additionally, the currency of excited states and reactive intermediates can, in another aspect of the invention, be put into a framework for synthon chemistry, anion relay chemistry, complex and coordination chemistry, supramolecular chemistry, confined and organized media chemistry.

In order to provide a foundation for the invention, attention is directed to some additional fundamentals that have been gathered together from a variety of areas and brought to use in various aspects of the present invention.

High-Level Overview of Chemical Reaction Initiation-Energy Processes

Many types of chemical reactions occur as a result of combining chemicals in ambient thermal and pressure conditions. Because these combinations occur under ambient conditions without additional excitation, for the purposes of this discussion these reactions can be termed ambient chemical reactions. Typically the chemical species in ambient chemical reactions are in ground-state rather than in an excited state.

Other chemical reactions require the addition of energy so that at least some reactants attain an activation energy required for the reaction to occur. In most laboratory and commercial production of chemicals, activation energy is attained by adding heat. Because these occur under thermally-induced conditions, for the purposes of this discussion these reactions can be termed thermochemical reactions.

Other types of chemical reaction processes obtain activation energy by other means. When light is used as the reaction-inducing energy source, the resultant reactions can be termed photochemical reactions. When an electrical current is used as the reaction-inducing energy source, the resultant reactions can be termed electrochemical reactions. When vibrations are used (invoke extremely high-energy cavation processes, for example) the resultant reactions can be termed sonochemical reactions. There are also other lesser known as well as largely unexplored possible variations and relatives of these, for example use of one or more of microwave excitation, electric fields, and or magnetic fields to induce chemical reactions.

Photochemical Reaction Processes

Photochemistry comprises a wide range of processes and phenomena, but in particular includes photochemical reaction processes wherein one photon (or more in high-intensity situations) is absorbed either:
   directly by a reactant, or
   indirectly by a photosensitizer (for example as tetraphenylporphyrin, cadmium, xenon, zinc, benzophenone, and organic dyes such as methylene blue) associated with and transferring absorbed energy to a reactant,
and as a result elevating the energy of the reactant to an excited state which subsequently permits or causes a chemical reaction. The first-level excited states associated with photochemistry and most photophysics typically have lower energy than the energy required for breaking a bound, so the LEDs described earlier in conjunction with FIG. 3 are typically sufficient to create at least first-level excited states in atoms, ions, molecules, complexes, and supramolecular structures.

For some photochemical reactions, the necessary activation energy is obtained (directly or indirectly) by the absorption of light. For other photochemical reactions, the resultant added energy obtained by the absorption of light (directly or indirectly) changes the electron configuration of a molecule, resulting in the opening of a normally unavailable reaction pathway.

Examples of photochemical reactions include electron transfer reactions, pericyclidelectrocyclic reactions, photoisomerization reactions, type I (photochemical cleavage) and type II Norrish reactions of atmospheric science, and an extremely wide variety of other reactions. For example, just in the context of photochemistry within transition metal complexes at least the following varieties of reaction types are known:
   Photoaddition
   Photocycloaddition
   Photo-induced rearrangements
   Photoisomerization
   Photoreduction
   Photodimerization
   Photoassisted double-bond migration
   Photo-induced insertion
   Photochemical ion ring-opening
   Photopolymerization
   Photosubstitution and photoreplacement
   Photohydrogenation
   Photodehydrogenation and photo-induced dehydrogenation
   Photo-oxygenation
   Photooxidation
   Photoassisted carbonylation
   Photodecarboxylation Outside the world of metal complexes, each of these photochemical processes can also be found, along with other common photochemical processes (for example photoabstraction) and other more specialized photochemical processes (such as photopinacolization).

Overall, photochemical reactions offer a rich, useful, rapidly evolving, and increasingly appreciated chemistry with many advantages and differences over ground-state chemistry, as well as (as shown in the list above) many things in common. Of particular note are the following:
   Photochemical reactions provide a means to produce some compounds that cannot be readily or realistically obtained by ambient or thermochemical reactions. In some cases of this, it is the unusual electron configurations that provide the pathway. In other cases, the fact that heating typically involves the simultaneous heating of multiple reactants and reaction products at once, some of which can thermally decompose or otherwise not remain stably available for the desired reaction.
   Excited state molecules and atoms behave as better electron donors and better electron acceptors than ground-state state molecules and atoms. Additionally, excited states have very different redox properties than those associated with ground-states. Both of these facts are useful in reaction and chemical synthesis planning.
   Many photochemical reactions involve the production of reactive intermediates. Although a diverse filed in itself, and one of value to aspects the invention, a definition for reactive intermediates suitable for this discussion can be found in [6] (which also provides the more formal IUPAC Gold Book definition):
      "A reaction intermediate or an intermediate is a molecular entity that is formed from the reactants (or preceding intermediates) and reacts further to give the directly observed products of a chemical reaction. Most chemical reactions are stepwise, that is they take more than one elementary step to complete. An intermediate is the reaction product of each of these steps, except for the last one, which forms the final product. Reactive intermediates are usually short lived and are very seldom isolated. Also, owing to the short lifetime, they do not remain in the product mixture."

In many photochemical reactions the chemical steps following photoexcitation are often that of radical ion reactive intermediates, chemistry not typically observed in ground-state organic reactions.

Photochemical reactions typically are extremely fast, for example in the nanosecond to even femtoseconds range, and in general many orders of magnitude faster than thermochemical reactions.

Examples of reactive intermediates of relevance to the invention include but are not limited to:

Arynes
Carbenes
Carbenoids
Carbocations
Carbanions (including ylides which in circumstances can be adapted to serve as reagents, for example as used in Wittig reactions)
Carbynes
Free radicals
Nitrenes
Nitrenium (a.k.a. aminylim and imidonium) ions
Ketenes (in some views)

Some reactive intermediates can be stabilized; examples of these include but are not limited to:

Oxonium ions (stabilized equivalents of carbocations)
Enolates (stabilized equivalents of carbanions)
Ylides (see above)
Ynolates (in the sense that they can serve as ketene precursors relevant to synthons, to be discussed).

It is noted that reactive intermediates can be chemically trapped by various means, including for example trapping of photochemically-generated reactive intermediates via amines. Such chemical trapping typically has been done for the purposes of verifying the existence and type of reactive intermediates. Additionally, reactive intermediates can be chemically stabilized (for example, as in the case of enoltaes). Trapped or chemically stabilized reactive intermediates can be freed and restored for use in later reactions.

Additionally, reactive species and photosensitizers have a range of absorption spectral peaks and valleys that differ so profoundly that they can readily form the basis of contemporary identification of substances.

Photochemistry has yet additional synthesis power and capabilities besides serving as a replacement for heat as a energy source for initiating chemical reactions. The excited states move electrons into higher orbitals and thus change aspects of the geometry in which electrons and orbitals interact and intermesh. A telling example of this is the case of pericyclic reactions wherein the set of all possible reactions in most cases split mutually-exclusively as to which reactions can occur with thermal excitation (i.e., in ground states) and which can occur with photochemical or other excitations that produces excited states. By way of orientation FIG. 4 depicts a simplified non-comprehensive view of the collection of chemical reactions calling out concerted reactions, pericyclic reactions, multi-step reactions, and reactive intermediates. In studying these, frontier orbital theory is often used to replace complicated Born-Oppenheimer calculations with geometric structures relationships. One of the concepts used is the geometric notion of conrotaty and disrotary action in positioning atoms for particular bonding circumstances. FIG. 5a, adapted from FIG. 2.43 of [10], depicts an exemplary conrotary action as can occur in a chemical reaction while FIG. 5b, adapted from FIG. 2.44 of [10], depicts an exemplary disrotary action as can occur in a chemical reaction. Another concept is the notion of supra- and antara-facial shapes of molecular orbitals. The Woodman-Hoffman rules (whose original creation was surprisingly claimed by Corey of synthon fame late in his career) predict the outcomes of ground-state and excited-state situations with respect to conrotary/disrotary actions, supra- and antara-facial shapes of molecular orbitals, and related concepts.

FIG. 6, partially adapted from [11] and further augmented, depicts a tabular summary of representative exemplary aspects of the Woodward-Hoffman rules for pericyclic chemical reactions. The complementary structure of the partition between reactions that are allowed or disallowed for ground-state and excited-state constituents is seen vividly in this table. (It is noted however, that in some circumstance steric effects may interfer with the predictions comprised by the table.) FIG. 7 combines parts of FIG. 4 and information from the table of FIG. 6 to demonstrate an example mutually-exclusive partition of possible pericyclic reactions into those reactions that are only possible with constituents excited states (as produced by photon absorption, and hence as occur in photochemical reactions) and those reactions that are only possible with constituents in ground states (as occur in thermal reactions).

Electrochemical Reaction Processes

Electrochemistry has historically held a significantly different role in the landscape of chemistry. Recent developments in organic electrochemistry have revealed or provided techniques for the following aspects relevant to the present invention:

The ability of electrochemical processes to add and remove electrons from organic molecules;
As a result, electrochemical processes can be used to reverse the polarity of functional groups (i.e., change nucleophiles into electrophiles and electrophiles into nucleophiles), which in turn can be employed to trigger umpolung (a.k.a. polarity inversion, polarity reversal) reactions not unlike those applied in Grignard reactions and condensations of aromatic aldehyde;
Reactive intermediates can be created;
The reactive intermediates can be trapped;
The trapped reactive intermediates can be employed to couple like-polarity functional groups (i.e., two nucleophiles or two electrophiles) in ways otherwise not thought to be possible;
These permit the creation of potential new synthesis approaches for complex molecules.

A slight older development in electrochemistry yet with a contemporarily life is that of electrochemical-induced chemiluminescence ("ECL"). The formal area of electrochemical-induced chemiluminescence has its own themes, orientations, motivations and applications, but in the course of these demonstrates the generation of excited states via electrochemical processes, for example the "Twisted Internal Charge Transfer" state ('TITC').

"Photoelectrochemistry" and "Electrophotochemistry"

It is noted that the terms "photoelectrochemistry" and "electrophotochemistry" have repeatedly emerged in the context of describing various situations such as:

electrochemical processes and photochemical processes working together either synergistically (for example improving photocatalytic efficiency) or in rapid sequence (electrochemical generation of agents followed by photochemical generation of active radicals);

combining photochemical and electrochemical methods for study of the oxidation-reduction, excited states, or reactive intermediates;

chemistry resulting from the interaction of light with electrochemical processes;

solar cells for generating electrical energy from light by means of a semiconducting photoanode and a metal cathode immersed in an electrolyte;

types of electrochemical luminescence.

Sonochemical Reaction Processes

Sonochemical processes have also been shown to generate excited states and reactive intermediates via the extreme thermal conditions occurring at cavitation sites, and sonochemical technology has been shown to be miniaturized to a microfluidic scale, but due to the mechanical power and acoustic transmission within materials, isolation is at least complex (if not impractical for low-cost mass-produced implementation). It is noted that there are results suggesting sonofication can aid and influence photochemical reaction processes via reactant micromixing and shockwaves. It is also noted that there are results suggesting ultrasonic stimulation can aid and influence electrochemical reaction processes.

Synthon Retrosynthesis Techniques

Synthon retrosynthetic techniques can be used to formalize chemical synthesis. FIG. 8, adapted from [16], depicts a representational example of retrosynthetic analysis. Various decompositions of the desired product molecule are considered, and for each candidate considered pathways are selected. The pathway alternatives comprise, for example, alternative assignments of opposing charges to the constituents. From these synthod primitives reagents can be selected. Although still evolving, synthon-based chemical synthesis is attractive for a wide-range chemical processing system under computer control (as provided for by selected aspects of the invention). Even though the synthon abstractions and the reagents that represent them are readily mappable to a computer and algorithmic representation, work in this area to date is limited. However because the synthon abstractions and the reagents that represent them are readily mappable to a computer and algorithmic representation, the invention provides for computer-processor control of synthon analysis and chemical synthesis design.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In an aspect of the invention, systems and methods for chemical synthesis via electron transfer, reactive intermediates and excited states are provided by combined, merged, or integrated photochemical and electrochemical processes.

In an aspect of the invention, a plurality of one or more of photochemical and electrochemical processes are simultaneously or sequentially used—leveraging the shared attributes of electron transfer, created excited states and created reactive intermediates—to create methods and systems for chemical synthesis.

In another aspect of the invention, at least one photochemical process is used to create a reactant species in an excited state and at least one electrochemical process is used to create another reactant species in an excited state.

In another aspect of the invention, selective use of absorption bands of reactive species and photosensitizers, selected species in a mixture many be selectively or sequentially photo-excited so as to drive one or more photochemical reactions in a mixture simultaneously or sequentially.

In another aspect of the invention, at least one photochemical process is used to create a reactant species in an excited state and at least one electrochemical process is used to create a reactive intermediate.

In another aspect of the invention, at least one photochemical process is used to create a reactive intermediate and at least one electrochemical process is used to create a reactant species in an excited state.

In another aspect of the invention, at least one photochemical process is used to create a reactive intermediate and at least one electrochemical process is used to create another a reactive intermediate.

In another aspect of the invention, reactive intermediates are trapped and freed at a later time for use in at least one chemical reaction.

In another aspect of the invention, reactive intermediates are chemically stabilized and restored at a later time for use in at least one chemical reaction.

In an aspect of the invention, at least one photochemical process is used to create a reactant species in an excited state and at least one electrochemical process is used to create an electron transfer reaction.

In another aspect of the invention, at least one photochemical process is used to create a reactive intermediate and at least one electrochemical process is used to create an electron transfer reaction.

In another aspect of the invention, the aforementioned electron transfer reaction created by the at least one electrochemical process is an umpolung (a.k.a. polarity inversion, polarity reversal) reaction.

In another aspect of the invention, the aforementioned umpolung (a.k.a. polarity inversion, polarity reversal) reaction is applied to an amine group.

In another aspect of the invention, the aforementioned umpolung (a.k.a. polarity inversion, polarity reversal) reaction employs dithiane compounds.

In another aspect of the invention, the aforementioned umpolung (a.k.a. polarity inversion, polarity reversal) reaction is used to facilitate anion relay chemistry (ARC).

In another aspect of the invention, a chemical process is used to inhibit or retard the back-reaction of at least one photochemical or electrochemical process.

In another aspect of the invention, a fixed structure is used to inhibit or retard the back-reaction of at least one photochemical or electrochemical process.

In another aspect of the invention, a modulated structure is used to inhibit or retard the back-reaction of at least one photochemical or electrochemical process.

In another aspect of the invention, an electrically-modulated liquid crystal structure is used to inhibit or retard the back-reaction of at least one photochemical or electrochemical process.

In another aspect of the invention, an electric field is used to inhibit or retard the back-reaction of at least one photochemical or electrochemical process.

In another aspect of the invention, one or more of the aforementioned processes and systems can be implemented as a flow reaction process or system.

In another aspect of the invention, two or more processes, these comprising one or both of photochemical and electrochemical processes, are used to create a telescoping reaction.

In another aspect of the invention, at least one of photochemical and electrochemical processes are used to create a first product in the presence of other materials, and at least one separation process is employed to separate the first product from the other materials.

In another aspect of the invention, the aforementioned first product is directed to at least one additional photochemical or electrochemical process.

In another aspect of the invention, two or more processes, these comprising one or both of photochemical and electrochemical processes, are simultaneously or sequentially used, leveraging the shared attributes of created excited states and created reactive intermediates, to create methods and systems for chemical analysis.

In another aspect of the invention, photochemical and electrochemical measurement processes are implemented as part of an analysis system.

In another aspect of the invention, photochemical and electrochemical measurement processes are implemented and used to provide observational input into a control process or system.

In another aspect of the invention, one or more of the aforedescribed are implemented within a microfluidic device.

In another aspect of the invention, one or more of the aforedescribed are implemented within systems employing a microfluidic device.

In another aspect of the invention, one or more of the aforedescribed are implemented within a lab-on-a-chip device.

In another aspect of the invention, one or more of the aforedescribed are implemented within systems employing a lab-on-a-chip device.

In another aspect of the invention, one or more of the aforedescribed are implemented within laboratory and specialty-chemical-manufacturing scale processes and systems.

In another aspect of the invention, one or more of the aforedescribed are implemented within a chemical plant.

In another aspect of the invention, a microfluidic system comprising a plurality of photochemical reaction stages, the microfluidic system comprising a computational processor, a plurality of electrically-controllable photochemical reaction stages, and a series of controllable interconnections for connecting the photochemical reaction stages is arranged so that the computational processor controls the plurality of electrically-controllable photochemical reaction stages and the controllable interconnections so as to implement a multi-step photochemical synthesis function.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIG. 4 depicts a simplified non-comprehensive view of the collection of chemical reactions calling out concerted reactions, percyclic reactions, multi-step reactions, and reactive intermediates.

FIG. 5a, adapted from FIG. 2.43 of [10], depicts an exemplary conrotary action as can occur in a chemical reaction.

FIG. 5b, adapted from FIG. 2.44 of [10], depicts an exemplary disrotary action as can occur in a chemical reaction.

FIG. 6, partially adapted from [11] and further augmented, depicts a tabular summary of representative exemplary aspects of the Woodward-Hoffman rules for pericyclic chemical reactions.

FIG. 11, adapted from [19], shows a more detailed comparative generalized representation of ground and excited (singlet "S" and triplet "T") electron states and energy levels of an organic molecule and various processes (absorption, fluorescence, phosphorescence, internal conversion, and intersystem crossings).

FIG. 16 depicts an exemplary arrangement comprising a plurality of individual reaction processes $\{R_1, \ldots, R_k\}$ wherein the product of a preceding reaction process is used in the next reaction process, providing a framework for implementation of anion relay chemistry ("ARC") or for synthon-principle design and implementation; alternatively it can be viewed as an abstract reaction network.

FIG. 17 depicts a simplified form of a telescoping reaction.

FIG. 18 depicts an exemplary arrangement wherein the "raw" product(s) $P_m$ resulting from the $m^{th}$ reaction process $R_m$ are directed to (a single, multiple, or combined) separation process(es) $S_m$ that separate out untelescoped product(s) $U_m$ so as to produce telescoped product(s) $T_m$ that are used in place of the "raw" product(s) $P_m$ presented to the next reaction process $R_m$.

DETAILED DESCRIPTION

Figure 1:
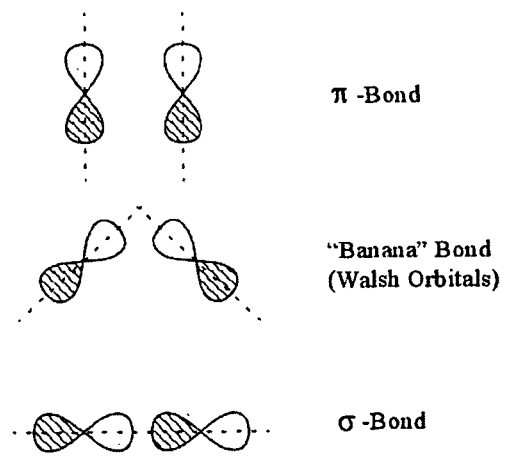
FIG. 1, adapted from FIG. 3.12 of [1], depicts π-bond, Walsh ("banana") bond, and σ-bond molecular orbitals as can be formed from p-orbitals of constituent atoms.
Figure 2:
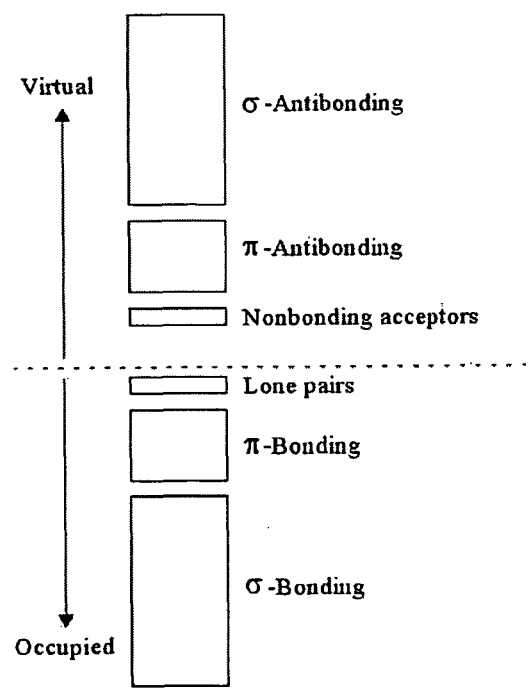
FIG. 2, adapted from FIG. 3.13 of [1], depicts a representative diagram of typical molecular orbital energy levels.
Figure 3:
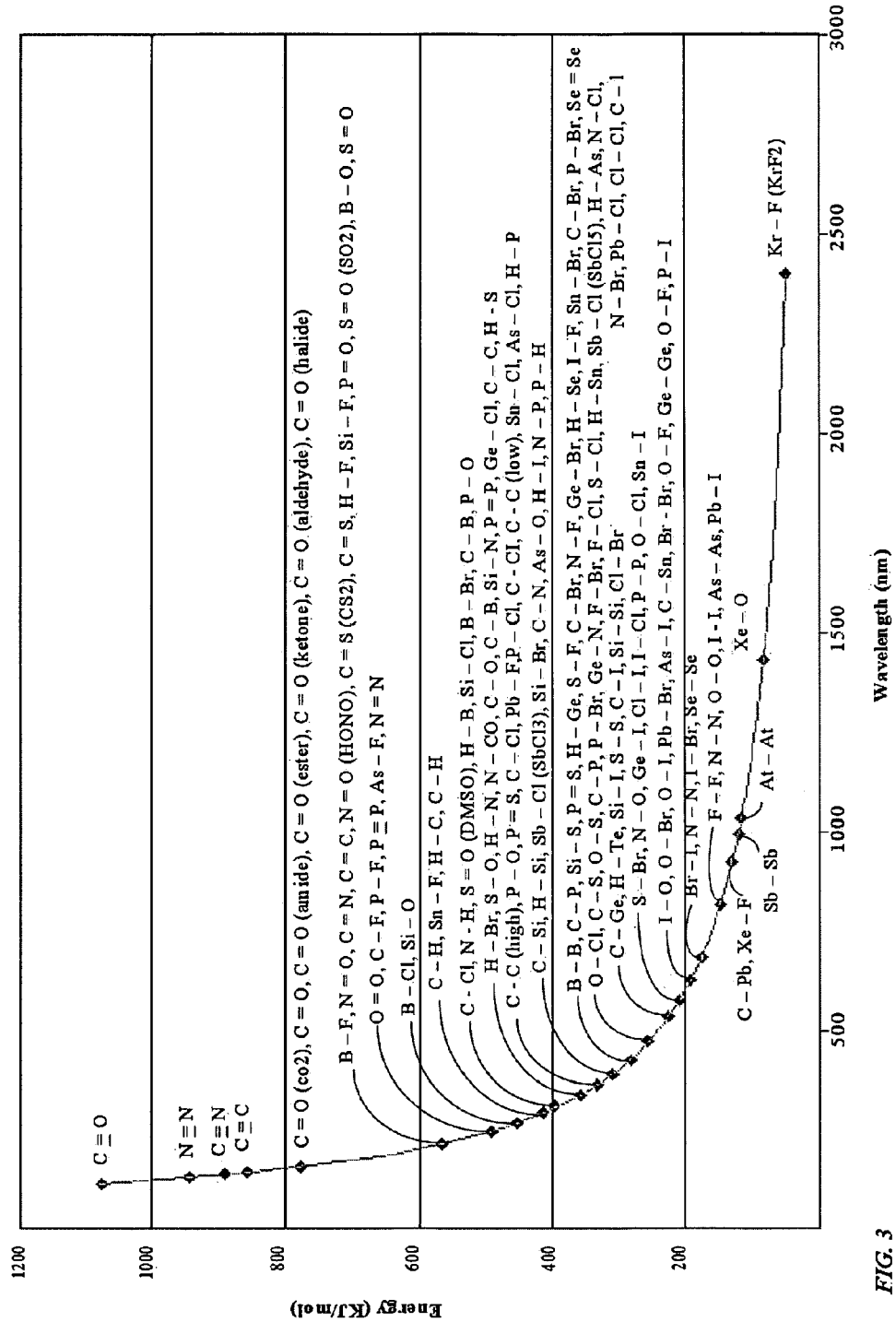
FIG. 3 depicts the energy and wavelengths required to break various bonds as is useful for photochemical synthesis.
Figure 7:
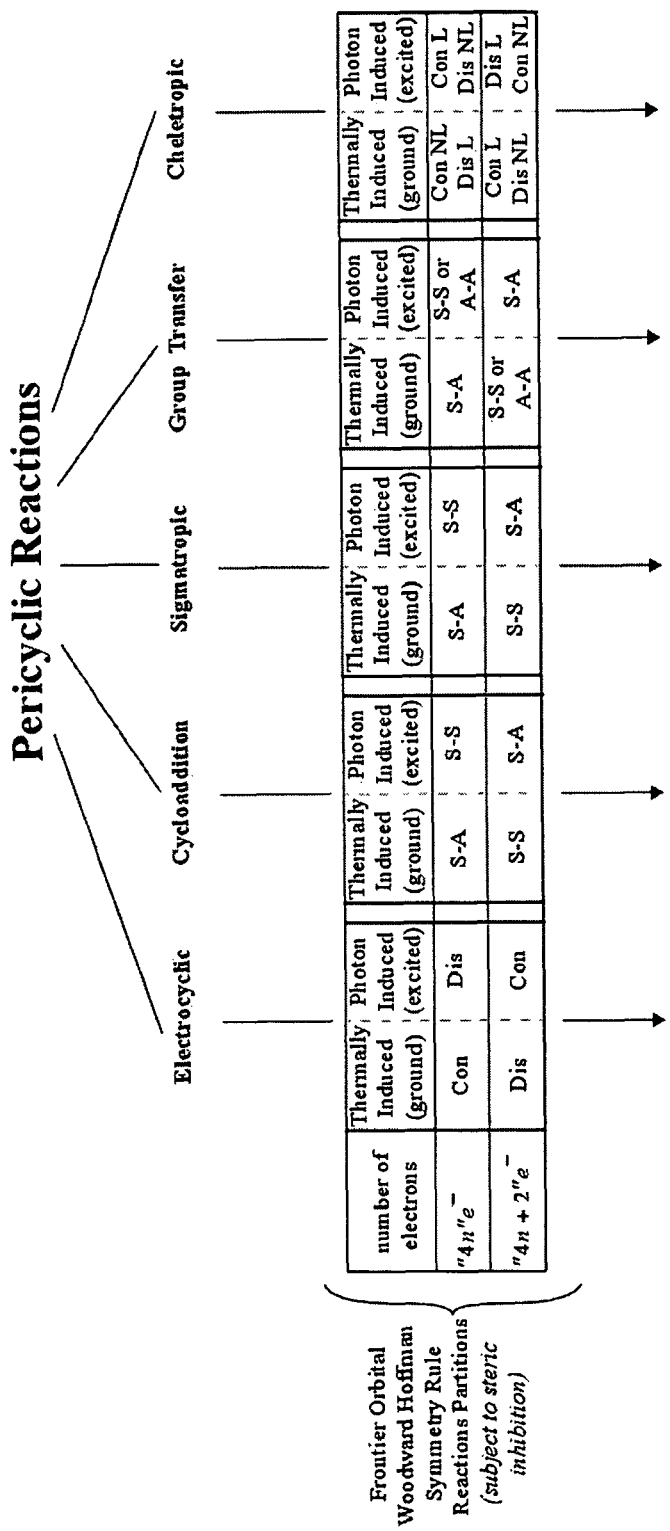
FIG. 7 combines parts of FIG. 4 and information from the table of FIG. 6 to demonstrate an example mutually-exclusive partition of possible pericyclic reactions into those reactions that are only possible with constituents excited states (as produced by photon absorption, and hence as occur in photochemical reactions) and those reactions that are only possible with constituents in ground states (as occur in thermal reactions).
Figure 8:
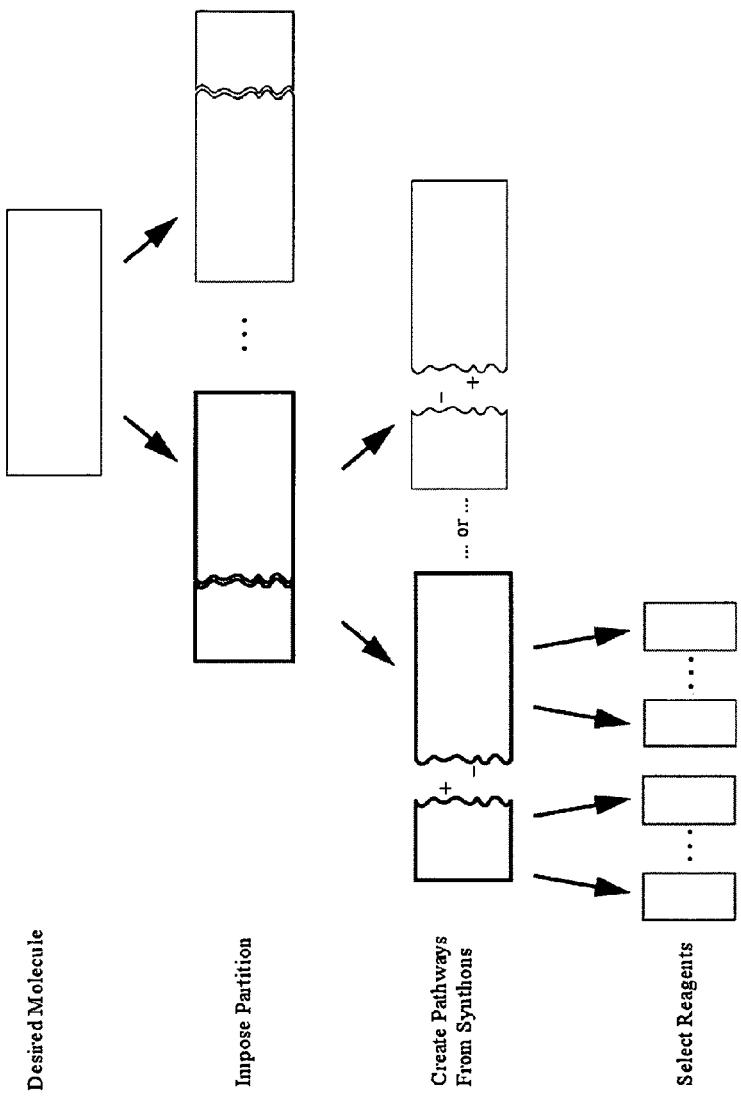
FIG. 8, adapted from [16], depicts a representation of retrosynthetic analysis.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

In the following, numerous specific details are set forth to provide a thorough description of various embodiments. Certain embodiments can be practiced without these specific details or with some variations in detail. In some instances, certain features are described in less detail so as not to obscure other aspects. The level of detail associated with each of the elements or features should not be construed to qualify the novelty or importance of one feature over the others.

The present invention comprises systems and methods for chemical synthesis via one or more of reactive intermediates and excited states from combined, merged, or integrated photochemical and electrochemical processes. To begin, a quick summary of the compatible and synergistic attributes among photochemistry, electrochemistry, and sonochemistry in synthesis is first provided.

Compatible and Synergistic Attributes Among Photochemistry, Electrochemistry, and Sonochemistry in Synthesis Thus, detail-selected areas of photochemistry and electrochemistry stand out as favorably comparatively sharing a number compatible and synergistic attributes, specifically items A-E in the following table. In addition, these detail-selected areas of photochemistry and electrochemistry also are easily spatial localized for isolation and readily miniaturized (items G and H), making them very attractive candidates for implementation within microfluidic and lab-on-a-chip devices and systems employing these devices. Further, each of photochemistry and electrochemistry comprise well-developed analytical techniques and offer the promise of new possibilities for analytical tools and processes.

| Index | Attribute | Photochemical Processes | Electro-chemical Processes | Sonochemical Processes |
|---|---|---|---|---|
| A | Creation of excited states | Yes via photon | Yes via electric current | Thermal (via cavitation) |
| B | Associated creation of reactive intermediates | Yes | Yes | Somewhat |
| C | Electron Transfer Reactions | Yes | Yes | Somewhat |
| D | Synthesis pathways not available to thermochemical synthesis | Yes | Yes | Somewhat |
| E | Trapping of reactive intermediates possible | Yes | Yes | Yes |

-continued

| Index | Attribute | Photochemical Processes | Electro-chemical Processes | Sonochemical Processes |
|---|---|---|---|---|
| F | Employ trapped reactive intermediates in subsequent reaction | Not established | Yes | Not established |
| G | Easily spatially localized for isolation | Yes | Yes | No |
| H | Readily miniaturized | Yes | Yes | Somewhat |
| I | Light emission processes available | Yes | ECL | Yes |
| J | Associated analysis functions | EM spectral (emission, absorption) | Voltammetry | Limited |

Thus there are potent, rich, and yet completely undeveloped opportunities for combining photochemical and electrochemical processes, simultaneously or sequentially—leveraging the shared attributes of electron transfer, created excited states and created reactive intermediates—to form fundamentally new types of chemical methods and systems for chemical synthesis and analysis.

Value of Photochemistry, Electrochemistry in Microfluidic, Lab-on-a-Chip, and Flow Reaction Technologies Further, because light emitting devices, light sensing devices, and electrodes can be readily implemented in small sizes, and because these detail-selected areas of photochemistry and electrochemistry also are easily spatial localized for isolation and readily miniaturized, there are potent, rich, and yet completely undeveloped opportunities for such fundamentally new types of chemical methods and systems for chemical synthesis and analysis to be miniaturized for implementation within microfluidic and lab-on-a-chip devices and systems employing these devices.

Additionally, because light emitting devices, light sensing devices, and electrodes can be readily implemented in small sizes, and because these detail-selected areas of photochemistry and electrochemistry also are easily spatial localized for isolation and readily miniaturized, there are potent, rich, and yet completely undeveloped opportunities to implement photochemical and electrochemical measurement processes in such a system. These can be used as analytical sensors, or as observing measurement elements for one or more control processes or systems.

In some circumstances it is possible to use the same optical semiconductor components as light emitters and as light sensors, for example employing time-division multiplexing, mode sequencing, or space-division arrangements as well be described. Similarly and accordingly, in circumstances it is possible to use the same optical semiconductor components as synthesis elements and as sensors or other analysis elements.

Similarly, in some circumstances it is possible to use the same electrodes for multiple of purposes, for example employing shared modalities, time-division multiplexing, mode sequencing, or space-division arrangements as will be described.

Additionally, because light emitting devices, light sensing devices, and electrodes can be distributed in a reactive chamber or conduit, one or more of the aforementioned processes and systems can be implemented as a flow reaction process or system. It is also pointed out that flow reaction approaches can be advantageously implemented as a component (or even principle function) in microfluidic technologies.

Further, although there are many aspects of microfludic technologies (such as increased surface-to-volume ratio facilitating increased heat transfer rates, more uniform temperature distrubition across cross-sections and volumes, special configurations to support high pressures and superheating, etc.) that provide advantageous handling of high pressures and extreme temperatures (for example as taught in [60]), in general microfluidic and lab-on-a-chip devices are easier to fabricate and can be manufactured at far smaller scales if there are no large pressure differences or temperature differences within the device.

Further, both optical semiconductors and electrodes are readily interfaced with microelectronics and as such can be readily interfaced with microprocessors, FPLAs, or other computational or procedural devices which can execute sequential or parallel algorithms. These fit photochemical and electrochemical processes neatly into microfluidic or lab-on-a-chip environments such as those described in pending U.S. patent application Ser. Nos. 11/946,678; 12/328,726; 12/328,716; and 12/328,713.

Synergies with Sonochemistry

At this writing, the potential contributions of sonochemical processes (when compared with the areas of photochemical and electrochemical processes described earlier) show great promise but appear to be in need of further study and innovation in order to facilitate widespread high-value adoption. This absolutely does not preclude the synergistic use of sonochemical processes together with one or more of photochemical and electrochemical processes in the creation of innovative valuable chemical processes and systems. Thus, the present invention provides for the inclusion of sonochemical processes in systems and methods comprising other aspects of the invention, and further provides for one or more of photochemical and electrochemical processes described to be augmented with sonochemical processes.

Excited States

Figure 9:
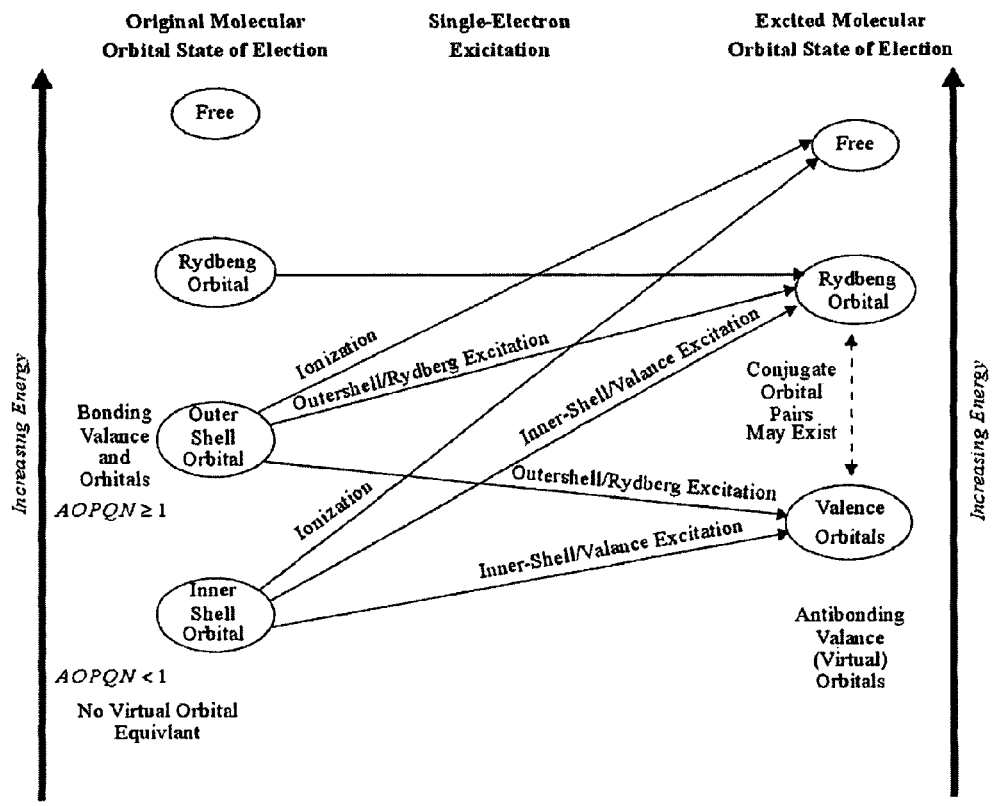
FIG. 9, adapted from the left portion of "FIG. I.A-1" of [15], depicts exemplary transition from ground states to excited states as provided for by the invention.

FIG. 9 (adapted from the left portion of "FIG. I.A-1" of [15]) depicts exemplary transition from ground states to excited states as provided for by the invention. As described earlier, both photochemical and electrochemical processes can be used to create molecules and individual atoms with electronically excited states. In an aspect of the invention, two or more of photochemical and electrochemical processes are simultaneously or sequentially used, leveraging the shared attributes of electron transfer, created excited states and created reactive intermediates, to create methods and systems for chemical synthesis.

Figure 10A:
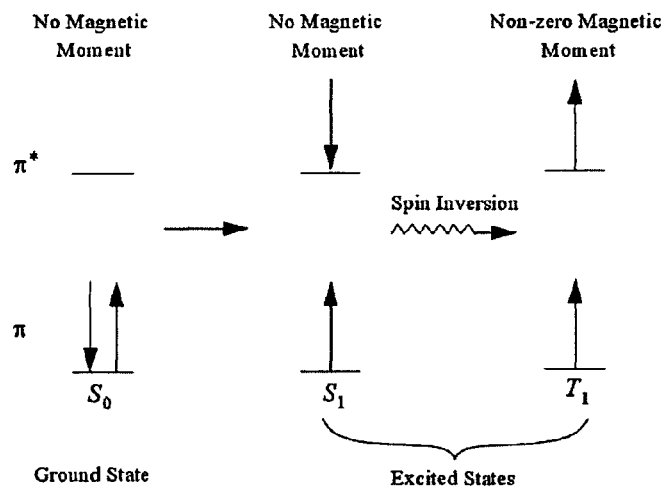
FIG. 10a, adapted from [17], depicts example transitions from ground state to the first single excited state to the first triplet excited state.

Creation of Electronically Excited States via Photon Absorption and Wavelength-Multiplexed Reaction Inducement FIG. 10a, adapted from [17], depicts example transitions from ground state to the first single excited state to the first triplet excited state.

Figure 10B:
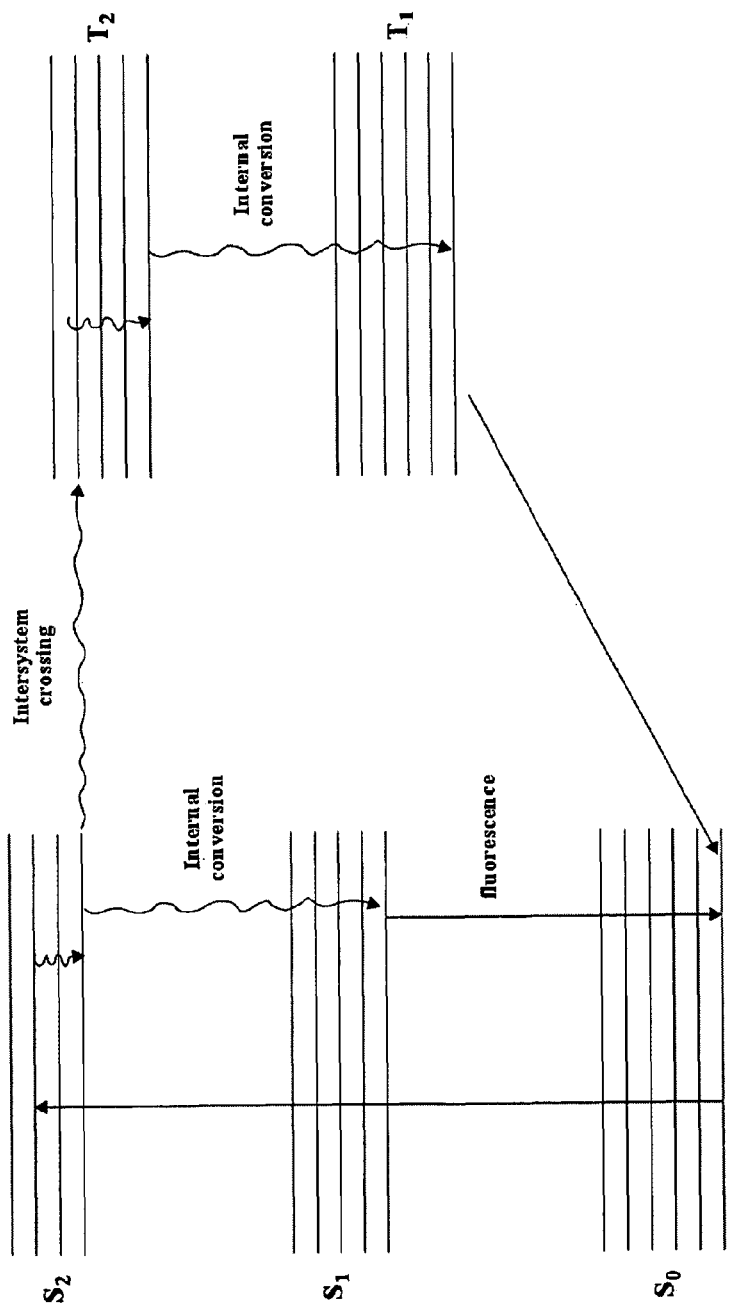
FIG. 10b, adapted from [18], shows a simplified classical Jablonski diagram depicting relationships among a number of photophysical processes relevant to photochemistry.

FIG. 10b (adapted from [18]) shows a simplified classical Jablonski diagram depicting relationships among a number of photophysical processes relevant to photochemistry. FIG. 11 (adapted from [19] FIG. 1.5) shows a more detailed comparative generalized representation of ground and excited (singlet "S" and triplet "T") electron states and energy levels of an organic molecule and various processes (absorption, fluorescence, phosphorescence, internal conversion, and intersystem crossings).

Figure 12:
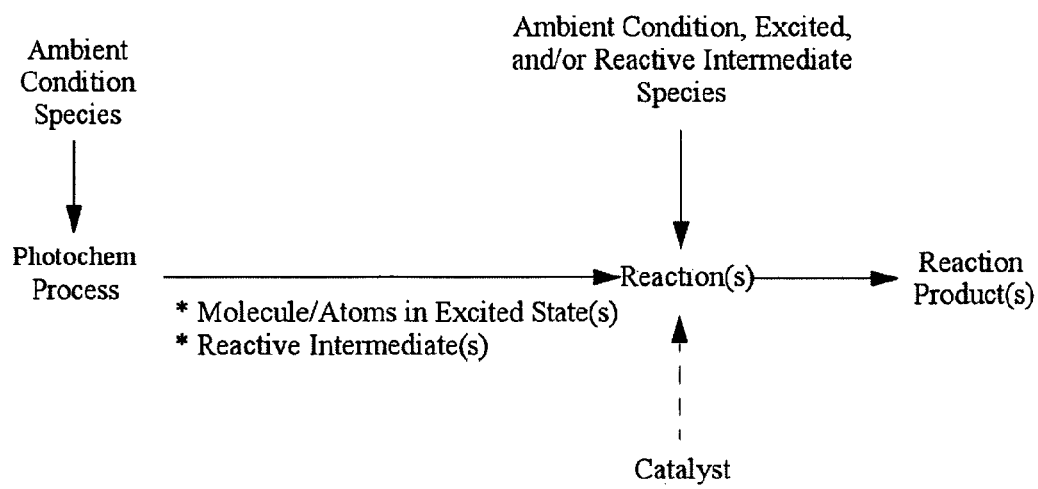
FIG. 12 depicts an exemplary arrangement wherein a photochemical process is applied to one or more ambient condition species, resulting in the invocation of excited states or at least one reactive intermediate.

FIG. 12 depicts an exemplary arrangement wherein a photochemical process is applied to one or more ambient condition species, resulting in the invocation of excited states. In situations of relevance to the invention the excited state can result in the creation of a reactive intermediate. In other situations of relevance to the invention the excited state can result in conformational change or molecular rearrangement. In an embodiment, the result is then subjected to one or more reactions with one or more other species in ambient or excited states, wherein the other species can, as advantageous, comprise one or more of reactive intermediates, excimers, and exciplexes. In an embodiment, at least one of the one or more reactions can employ use of a catalyst. The result of the one or more reactions comprises one or more reaction products.

As pointed out earlier, reactive species and photosensitizers have a range of absorption spectral peaks and valleys that differ so profoundly from most other chemical constituents that they form the basic of contemporary identification of substances.

Thus it is possible to make selective identifications, organizations, and use of absorption bands of reactive species and photosensitizers so as to create systems and methods wherein differing wavelengths of light can be used to selectively stimulate selected species in a mixture so as to initiate selected photochemical reactions.

Coyle has pointed out that different photochemical reactions can be selectively initiated by irradiation with light of corresponding selectively-chosen wavelengths [23]. Additionally, it is known that the reactivity and photochemistry of a compound can respond in a wavelength-dependent manner, for example as in many chromophores such as azobenzenes, diaryethenes, fulgides, salicylindeanline, spiropyrans, thioindigos, and trans-urocanic acid.

The present invention adapts these to systems and methods for selectively or sequentially driving one or more photochemical reactions in a mixture simultaneously or sequentially as can be advantageous in an application or embodiment. In another aspect of the invention, selective use of absorption bands of reactive species and photosensitizers, selected species in a mixture many be selectively or sequentially photo-excited so as to drive one or more photochemical reactions in a mixture simultaneously or sequentially.

Creation of Excited States, Excimers, and Exciplexes via Photoinduced Processes and Electric Currents Usually the interaction among components of a supramolecular structures that are in an excited-state and the components that are ground-state in ground state are of little consequence. In some situations, the interaction is strong enough to create an alternate form of chemical species. If these are result in excited dimers the alternate form of chemical species is called an "excimer." If these are result in excited complex, the alternate form of chemical species is called an "exciplex." Excimers and exciplexes serve as electron-transfer and energy-transfer mechanisms in supramolecular systems. Their formation is reversible and the decay process can include luminescence.

Figure 13:
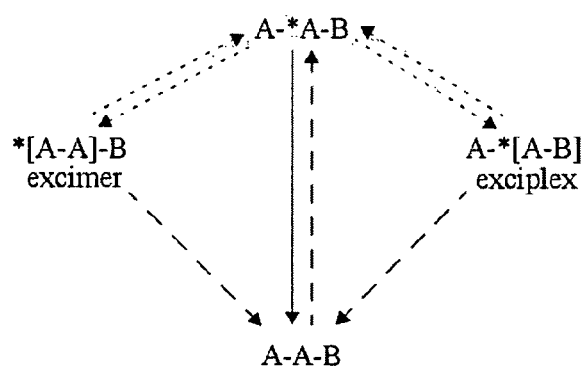
FIG. 13, adapted from FIG. 9 of [20], depicts an example of excimer and exciplex transition processes as are associated with photochemistry electrochemistry in metal complexes and other types of supramolecular structures.

Although excited states, excimers, and exciplexes are usually associated with photochemical processes, electrochemical processes can also be used. As mentioned earlier, electrochemical processes can create excited states. An example of this of recent widespread interest is the "Twisted Internal Charge Transfer" state (TITC), although other types also occur. Electrochemical processes are known to create excimers and exciplexes. FIG. 13, adapted from FIG. 9 of [20], depicts an example of excimer and exciplex transition processes as are associated with photochemistry or electrochemistry in metal complexes and other types of supramolecular structures. The invention therefore provides for excited state, excimer, and exciplex processes, for example as can be used for chemical synthesis, and further for these excited state, excimer, and exciplex processes to be induced by not only photochemical means (for example, via emitted light an LED) but also electrochemical means (via electrical potential and currents among electrodes).

Figure 14:
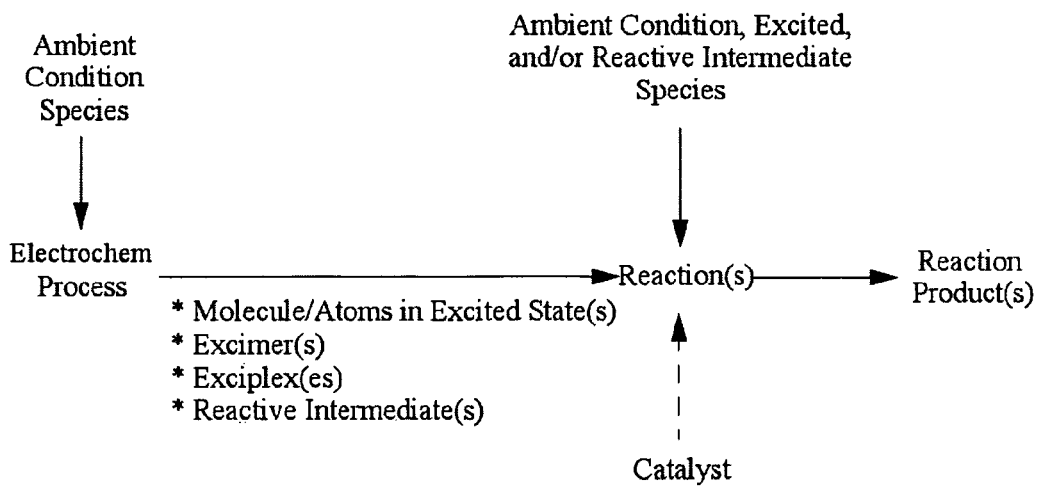
FIG. 14 depicts an exemplary arrangement wherein an electrochemical process is applied to one or more ambient condition species, resulting in the invocation of excited states or at least one reactive intermediate.

FIG. 14 depicts an exemplary arrangement wherein an electrochemical process is applied to one or more ambient condition species, resulting in the invocation of excited states. In situations of relevance to the invention the excited state can result in the creation of a reactive intermediate. In other situations of relevance to the invention the excited state can result in conformational change or molecular rearrangement. In other situations of relevance to the invention the excited state can result in the creation of excimers. In other situations of relevance to the invention the excited state can result in the creation of exciplexes. In an embodiment, the result is then subjected to one or more reactions with one or more other species in ambient or excited states, wherein the other species can, as advantageous, comprise one or more of reactive intermediates, excimers, and exciplexes. In an embodiment, at least one of the one or more reactions can employ use of a catalyst. The result of the one or more reactions comprises one or more reaction products.

Creation of Electron Transfer Reactions by Photochemical or Electrochemical Processes As described earlier, both photochemical and electrochemical processes can be used to create electron transfer reactions.

In an aspect of the invention, at least one photochemical process is used to create a reactant species in an excited state and at least one electrochemical process is used to create an electron transfer reaction.

In another aspect of the invention, at least one photochemical process is used to create a reactive intermediate and at least one electrochemical process is used to create an electron transfer reaction.

In another aspect of the invention, the aforementioned electron transfer reaction created by the at least one electrochemical process is an umpolung (a.k.a. polarity inversion, polarity reversal) reaction.

In another aspect of the invention, the aforementioned umpolung (a.k.a. polarity inversion, polarity reversal) reaction is applied to an amine group.

In another aspect of the invention, the aforementioned umpolung (a.k.a. polarity inversion, polarity reversal) reaction employs dithiane compounds.

In another aspect of the invention, the aforementioned umpolung (a.k.a. polarity inversion, polarity reversal) reaction is used to facilitate anion relay chemistry ("ARC").

Combining Excited States, Reactive Intermediates, and Other Processes Created by Photon Absorption and Electric Currents in a Single Reaction Environment As discussed earlier, both selected photochemical processes and selected electrochemical processes are able to generate:

atom and molecules in excited states;
reactive intermediates;
electron transfer reactions.

Additionally, selected electrochemical processes are able to generate:

excimers;
exciplexes;
umpolung (a.k.a. polarity inversion, polarity reversal) reactions.

It has also been shown that photochemical processes can also generate umpolung processes.

Synergistically combining these in an unprecedented inventive step so as to obtain entirely new synergies, reaction types, chemical processing methods and chemical processing devices for chemical analysis and synthesis, selected photochemical processes and selected electrochemical processes are synergistically combined to create a combined reaction environment or combined reaction process. The combined reaction environment or combined reaction process can accordingly leverage one or more of:
- excited states;
- reactive intermediates;
- electron transfer reactions (including umpolung processes and reactions);
- excimers;
- exciplexes;
- other processes and reactions created by photochemical, photophysical, and electrochemical processes.

It is additionally noted that incident light affects electrode processes in electrochemistry. Emitted light at electrodes can also be used to at least partially characterize constituents in electrochemical processes.

Figure 15:
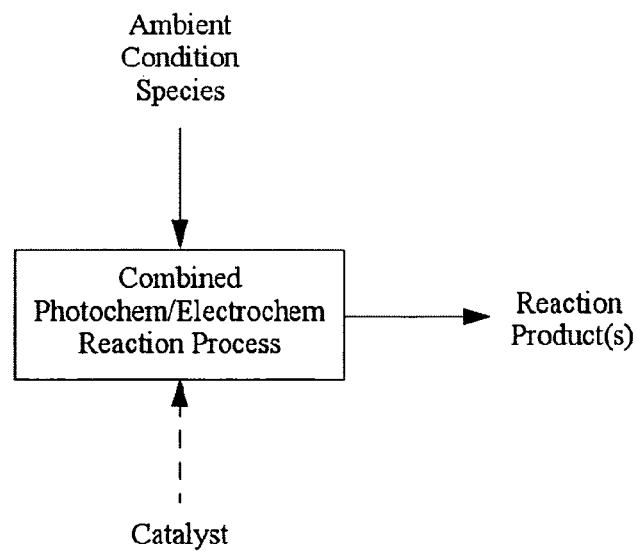
FIG. 15 depicts an exemplary arrangement wherein a photochemical process and an electrochemical process are combined to synergistically create a combined reaction process resulting in one or more reaction products.

FIG. 15 depicts an exemplary arrangement wherein a photochemical process and an electrochemical process are combined to synergistically create a combined reaction process resulting in one or more reaction products. In an embodiment, one or more aspects of the combined reaction process can employ use of a catalyst. This arrangement can also be used as a component in a sequential reaction environment such as those discussed below.

In an aspect of the invention, the combined photochemical/electrochemical reaction process is used as a component or step in systems and methods for chemical synthesis.

In another aspect of the invention, the combined photochemical/electrochemical reaction process is used as a component or step in systems and methods for chemical analysis.
Combining Excited States, Reactive Intermediates, and Other Processes Created by Photon Absorption and Electric Currents in a Sequential Reaction Environment In another inventive step, one or more of at least one:
- selected photochemical process,
- selected electrochemical process,
- selected combined photochemical/electrochemical reaction process are sequentially combined to create a sequential reaction environment or sequential reaction process. The sequential reaction environment or sequential reaction process can accordingly leverage one or more of:
- excited states;
- reactive intermediates;
- electron transfer reactions (including umpolung processes and reactions);
- excimers;
- exciplexes;
- other processes and reactions created by photochemical, photophysical, and electrochemical processes.

In another aspect of the invention, at least one photochemical or electrochemical process are used to create a first product in the presence of other materials, and at least one separation process is employed to separate the first product from the other materials. In another aspect of the invention, the aforementioned first product is directed to at least one additional photochemical or electrochemical process.

In an aspect of the invention, two or more photochemical and electrochemical processes are simultaneously or sequentially used to create methods and systems for chemical synthesis.

In another aspect of the invention, two or more photochemical and electrochemical processes are simultaneously or sequentially used to create methods and systems for chemical analysis.

In an aspect of the invention, at least one photochemical process is used to create a reactant species in an excited state and at least one electrochemical process is used to create another reactant species in an excited state.

In another aspect of the invention, at least one photochemical process is used to create a reactant species in an excited state and at least one electrochemical process is used to create a reactive intermediate.

In another aspect of the invention, at least one photochemical process is used to create a reactive intermediate and at least one electrochemical process is used to create a reactant species in an excited state.

In another aspect of the invention, at least one photochemical process is used to create a reactive intermediate and at least one electrochemical process is used to create another a reactive intermediate.

Multistage Architectures

FIG. 16 depicts an exemplary arrangement comprising a plurality of individual reaction processes $\{R_1 \ldots R_k\}$ wherein the product(s) $P_m$ of a preceding reaction process $R_m$ is used in the next reaction process $R_{m+1}$.

In general, each of these individual reaction processes of the collection $\{R_1, \ldots, R_k\}$ can comprise at least one of a:
- photochemical process,
- electrochemical process,
- combined photochemical/electrochemical reaction process.

In general, each of the individual product(s) of the collection $\{R_1, \ldots, R_k\}$ can comprise one or more individual species. In the notation, the symbol $P_m$ (associated the $m^{th}$ reaction process $R_m$) can represent a single product species (i.e., $P_m$ represents a single element) or a collection of product species:

$$P_m = \{P_{m(1)}, \ldots, P_{m(j)}\}$$

(i.e., here the notation $P_m$ represents a vector).

Further, in general, each of the individual reaction processes of the collection $\{R_1, \ldots, R_k\}$ can, as advantageous, employ at least one catalysis. In the notation, the symbol $C_m$ (associated the $m^{th}$ reaction process $R_m$) is used to represent a single catalyst (i.e., $C_m$ represents a single element) or a collection of catalysts:

$$Cm = \{Cm(1), \ldots, Cm(j)\}$$

(i.e., here the notation Cm represents a vector).

Viewed as a multistage chemical processing architecture, the arrangement described above and depicted in FIG. 16 provides a system and method for implementing a photochemical, electrochemical, or combined photochemical/electrochemical reaction network.

The arrangement described above and depicted in FIG. 16 can also be viewed as a framework for implementation of anion relay chemistry ("ARC"), as an abstract reaction network, as a framework for synthon-principle design and implementation, and as a framework for combinational chemistry design and implementation.

When implemented literally, such the multistage chemical processing architecture depicted in FIG. 16 works most desirably if each or most of the individual reaction processes is "neat" (i.e., high yielding). Such a reaction chain is known as a telescoping reaction, depicted in a simplified form in FIG. 17.

In situations where one or more of the individual reaction processes is not "neat" (i.e., not high yielding), the arrangement does not implement a formal telescoping reaction. Despite this, in some situations the arrangement as depicted in FIG. 16 still can be advantageous should the undesirable or unneeded results or unused components of the reaction process can be tolerated in the process and removed if needed at the end of the sequence. In other situations one or more separation processes can be introduced to remove some reaction products before telescoping to the next reaction process. FIG. 18 depicts an exemplary arrangement wherein the "raw" product(s) $P_m$ resulting from the $m^{th}$ reaction process $R_m$ are directed to (a single, multiple, or combined) separation process(es) $S_m$ that separate out untelescoped product(s) $U_m$ so as to produce telescoped product(s) $T_m$ that are used in place of the "raw" product(s) $P_m$ presented to the next reaction process $R_m$.

Use of the Multistage Architecture in Photochemical and Electrochemical Implementations of Anion Relay Chemistry, Synthon Chemistry, and Combinational Chemistry As mentioned above, the multistage architecture described above and depicted in FIG. 16 can also be viewed as a framework for implementation of anion relay chemistry ("ARC"), as a framework for synthon-principle design and implementation, and as a framework for combinational chemistry design and implementation.

The invention provides for the multistage architecture depicted in FIG. 16, further incorporating separation stages as described above and depicted in FIG. 17 as can be needed or advantageous, to create systems and methods for synthon-principle design and implementation. In particular:

Reactive intermediates can be readily structured by type and use and can be organized for broad classes of substitution reactions (dating back to, for in the case of free radicals); thus reactive intermediates appear directly useful as synthon elements;

Photochemical synthesis is rich in structures and strategies that can be adapted to the synthon framework;

umpolung processes provided by electrochemistry and photochemistry can be used in processes involving umpoled synthons;

Though not yet as well structured as photochemical synthesis, both older and more recent understandings of synthetic organic electrochemistry provide a viable framework for structuring and identifying useful viable synthons within electrochemical synthesis.

Using similar rationale, the invention provides for the aforedescribed multistage architecture depicted in FIG. 16, further incorporating separation stages as described above and depicted in FIG. 17 as can be needed or advantageous, to create systems and methods for combinational chemistry design and implementation.

Using similar rationale, together with aspects of chemical reaction networks (and for example drawing from themes from dithiane chemistry, the invention provides for the aforedescribed multistage architecture depicted in FIG. 16, further incorporating separation stages as described above and depicted in FIG. 17 as can be needed or advantageous, to create systems and methods for anion relay chemistry.

Figure 19:
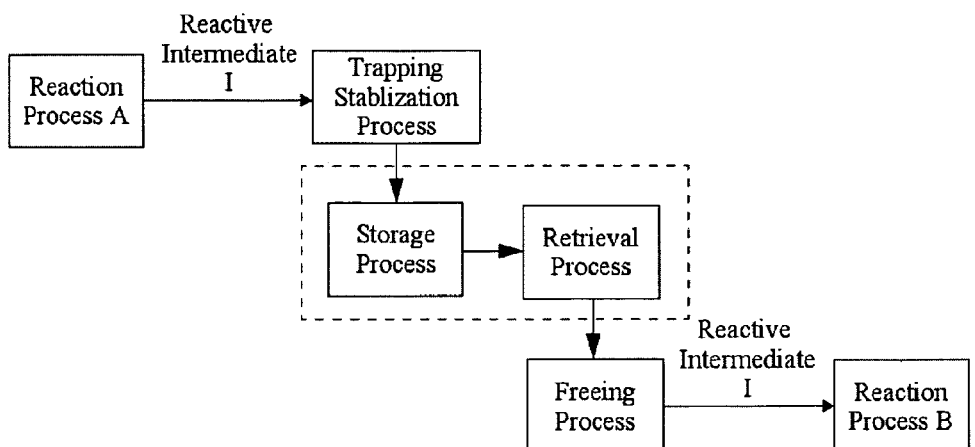
FIG. 19 depicts a forward photochemical or electrochemical reaction working against a back reaction.

Trapping and Chemically Stabilizing Reactive Intermediates and Freeing for Later Use Reactive intermediates can be trapped and chemically stabilized for later use by a trapping or stabilizing process. At a later time, a trapped and chemically stabilized reactive intermediate can be freed by a freeing process for use in a reaction process. FIG. 19 depicts an exemplary arrangement for trapping and chemically stabilizing a reactive intermediate generated by a first reaction process ("A"), storing the trapped and stabilized reactive intermediate, later retrieving the trapped and stabilized reactive intermediate, freeing the reactive intermediate, and utilizing it in a second reaction process ("A").

In another aspect of the invention, reactive intermediates are trapped and freed at a later time for use in at least one chemical reaction.

In another aspect of the invention, reactive intermediates are chemically stabilized and restored at a later time for use in at least one chemical reaction.

In an embodiment, a reactive intermediate is trapped or chemically stabilized as a persistent carbine.

In an embodiment, a reactive intermediate is trapped or chemically stabilized as an enol.

In an embodiment, a reactive intermediate is trapped or chemically stabilized as a ylide.

Synthesis and the Inhibition or Retardance of Back-Reactions

Figure 20:
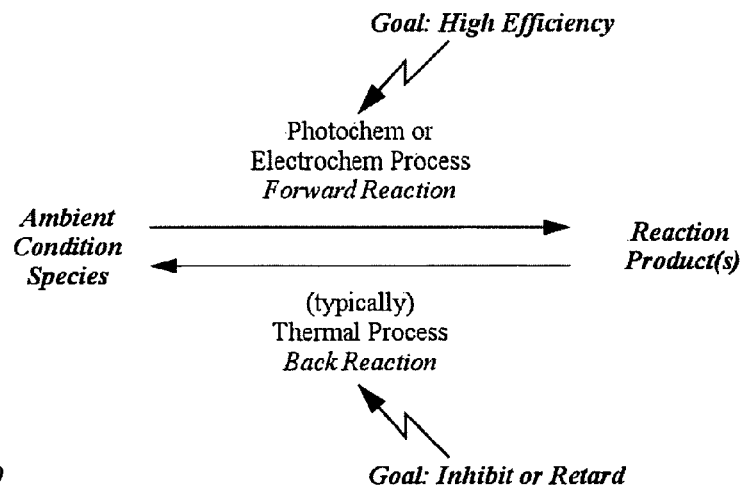
FIG. 20 depicts forward and backward reaction processes of relevance in synthesis aspects of the invention.

Photochemical and electrochemical reactions will typically have to work against a (usually thermal) back-reaction. FIG. 20 depicts a forward photochemical or electrochemical reaction working against a back reaction.

Known means of dominating or inhibiting the back-reaction include:

Removal of at least one reaction product, for example via separation;

Insuring the photochemical or electrochemical reaction advantageously has much higher efficiency when compared to the back reaction;

In nature, and increasingly in chemical science and engineering, selected properties of organized structures (micelles, complexes, host-guest arrangements, container molecules, microemulsions, monolayer and bilayer membranes, vesicles, polyelectrolytes, and zeolites) can be used to inhibit back-reactions through various means including creation of micro-environments, electrostatic interactions at structure interfaces, etc.). In one approach, photochemistry within bound structures can be used to control the initial electron transfer step (for example, though covalently bound moieties.

In an aspect of the invention, a chemical process is used to inhibit or retard the back-reaction of at least one photochemical or electrochemical process.

In another aspect of the invention, a fixed structure is used to inhibit or retard the back-reaction of at least one photochemical or electrochemical process.

Figure 21:
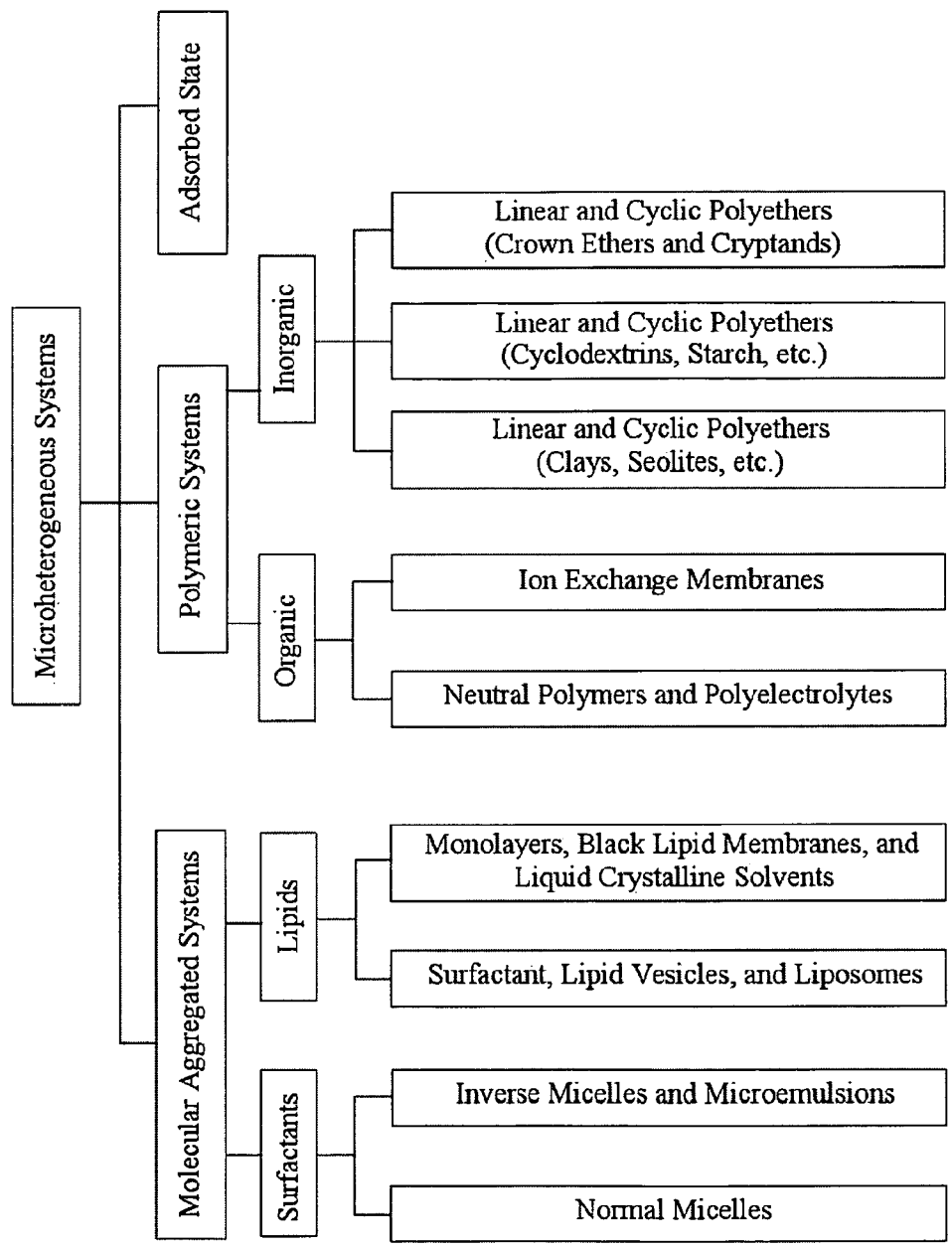
FIG. 21, adapted from FIG. 1.1 of [19], depicts various example classifications of various microheterogeneous systems and relationships among them.

FIG. 21, adapted from FIG. 1.1 of [19], depicts various example classifications of various microheterogeneous systems and relationships among them. Fixed structures useful for such back-reaction impeding microenvironments can include various types of intercalation materials. However, similar microenvironments can be provided by other types of intercalation materials, including liquid crystals. It is known that the mesoscopic structure of liquid crystal materials can be modulated by controlled electrical stimulus (this being the basis of a wide variety of electronically controlled LCD visual information displays). Other types of mechanically-variable materials whose mesoscopic structure is responsive to electrical stimulus can be created from various types of polymer materials. Thus it is possible to create a material whose mesoscopic structure can be modulated. The invention provides for at least some modes of such modulated mesoscopic structures to serve as microenvironments for impeding back-reactions of a photochemical or electrochemical process In an aspect of the invention, a modulated structure is used to inhibit or retard the back-reaction of at least one photochemical or electrochemical process.

In another aspect of the invention, an electrically-modulated liquid crystal structure is used to inhibit or retard the back-reaction of at least one photochemical or electrochemical process.

In another aspect of the invention, an electric field is used to inhibit or retard the back-reaction of at least one photochemical or electrochemical process.

Implementation as Flow Reaction Processes

The multistage architecture described above and depicted in FIG. 16 naturally provides a reaction pipeline. The reaction pipeline can be readily adapted to form elements of a flow reaction process or system for synthesis and analysis.

The invention provides for the multistage architecture depicted in FIG. 16, further incorporating as can be needed or advantageous separation stages as described above and depicted in FIG. 17 and reactive intermediate capture, storage, and retrieval operations as described above and depicted in FIG. 19, to create systems and methods for flow reaction process or system.

In an aspect of the invention, one or more of the aforementioned processes and systems can be implemented as a flow reaction system.

In another aspect of the invention, one or more of the aforementioned processes and systems can be implemented to provide flow reaction chemical synthesis.

In another aspect of the invention, one or more of the aforementioned processes and systems can be implemented to provide flow reaction chemical analysis.

Analysis Processes and Instrumentation

Synthesis and other reaction techniques can also be used for chemical analysis. Further, electrochemical process such as voltammetry and other related processes, as well as photoemission from electrochemical electrodes, have significant established functionality and value in chemical analysis. The arrangements of FIGS. 15, 16, 18 can, for example, be adapted to use in chemical analysis. The arrangements of FIGS. 16 and 18 can be followed, supplemented, merged, and augmented with electrochemical cells and electronics suitable for voltammetry and other related chemical analysis processes.

Figure 22:
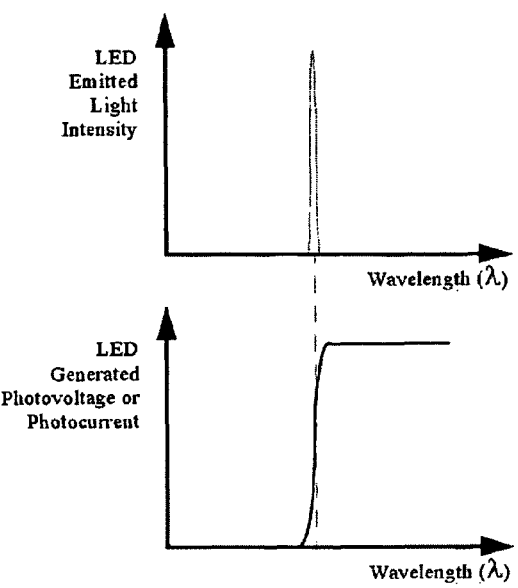
FIG. 22 depicts the responses and relationships between the emitted light from an LED as a function of wavelength and the generated photovoltage/photocurrent for the same LED as a function of wavelength.

FIG. 22 depicts the responses and relationships between the emitted light from an LED as a function of wavelength and the generated photovoltage/photocurrent for the same LED as a function of wavelength. As advantageous, an embodiment can use the same optical semiconductor components as light emitters and as light sensors, for example employing time-division multiplexing, mode sequencing, or space-division arrangements. Similarly as advantageous, an embodiment can use the same optical semiconductor components as synthesis elements and as sensors or other analysis elements. Additionally, an embodiment can use the same electrodes for multiple of purposes, for example employing shared modalities, time-division multiplexing, mode sequencing, or space-division arrangements. However, special electronics (such as high-impedance JFET-input amplifiers, periodic current switching, and other know instrumentation techniques) are typically required to measure photovoltages, photocurrents, photo-induced space-charge, and other measurable photo-induced effects useful for incident-light amplitude measurement. Further, the photosensing response (photovoltage, photocurrent, photo-induced space-charge, etc.) as a function of wavelength has a "shelf" characteristic rather than the narrow bandpass characteristic of LED light emission. This "shelf" characteristic is "low-pass" with respect to wavelength and "high-pass" with respect to energy.

In diode array detection approaches to High-Performance Liquid Chromatography (HPLC), the absorption spectrum is used to characterize proteins and other materials in chemical analysis of a sample. Also, as mentioned earlier, reactive species and photosensitizers have a range of absorption spectral peaks and valleys that differ so profoundly that they can readily form the basis of contemporary identification of substances. The present invention adapts these, extending to include other processes such as photoluminescence (phosphorescence, fluorescence, etc.), together with the use of LED arrays as wavelength-specific light sources and wavelength-specific light sensors, to perform photochemical and photophysical measurements of chemical samples.

Figure 23:
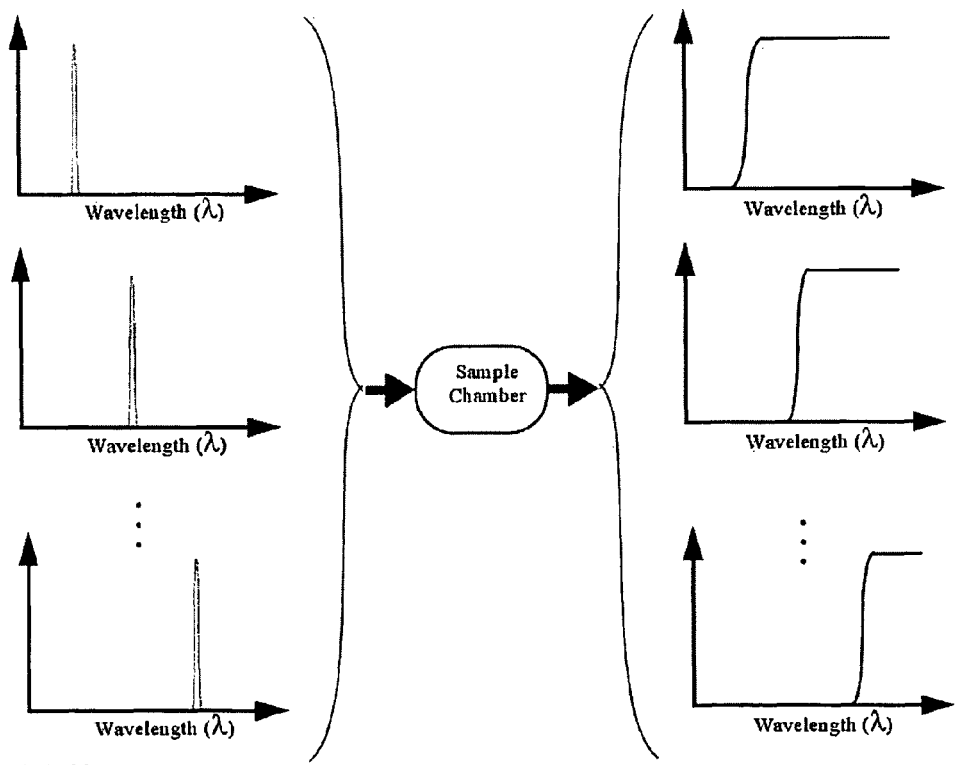
FIG. 23 depicts an exemplary diode array detection arrangement employing a plurality of LEDs with light emission wavelengths distributed over a range of wavelengths. Note in these response plots that the wavelength decreases from left to right.

In more detail, FIG. 23 depicts an exemplary diode array detection arrangement employing a plurality of LEDs with light emission wavelengths distributed over a range of wavelengths. Note in these response plots that the wavelength decreases from left to right.

Figure 24:
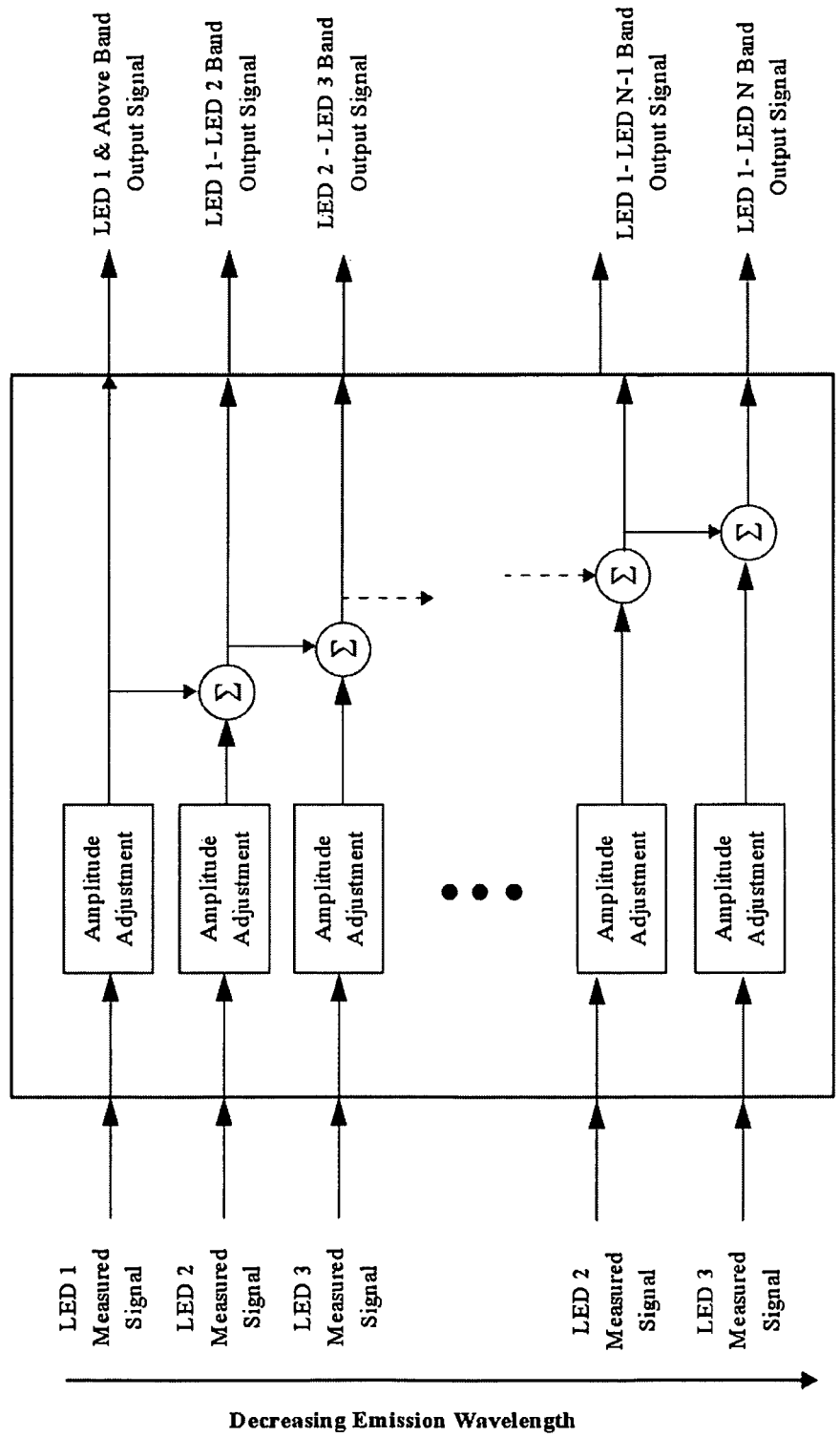
FIG. 24 depicts an exemplary arrangement for transforming a plurality of "shelf" characteristic ("low-pass" for wavelength, "high-pass" for energy) light-amplitude wavelength-spectral measurements such as produced by the arrangement depicted in FIG. 23 into an associated plurality of "band-pass" light-amplitude wavelength-spectral measurements. Note in these response plots that the wavelength decreases from left to right.

FIG. 24 depicts an exemplary arrangement for transforming a plurality of "shelf" characteristic ("low-pass" for wavelength, "high-pass" for energy) light-amplitude wavelength-spectral measurements such as produced by the arrangement depicted in FIG. 23 into an associated plurality of "bandpass" light-amplitude wavelength-spectral measurements. This is accomplished by subtracting signals from photosensing LEDs that would also be activated by the given wavelength so as to create a collection of separate outputs that operate mutually exclusively. In some applications a small collection of LED wavelengths can be selected to cover a collection of specific desired partitioned measurements. In some applications a larger collection of LED wavelengths can be used to more uniformly cover a contiguous range of wavelengths with a separate electrical output for a contiguous but mutually exclusive wavelength bands. Note in these response plots that the wavelength decreases from left to right.

Figure 25:
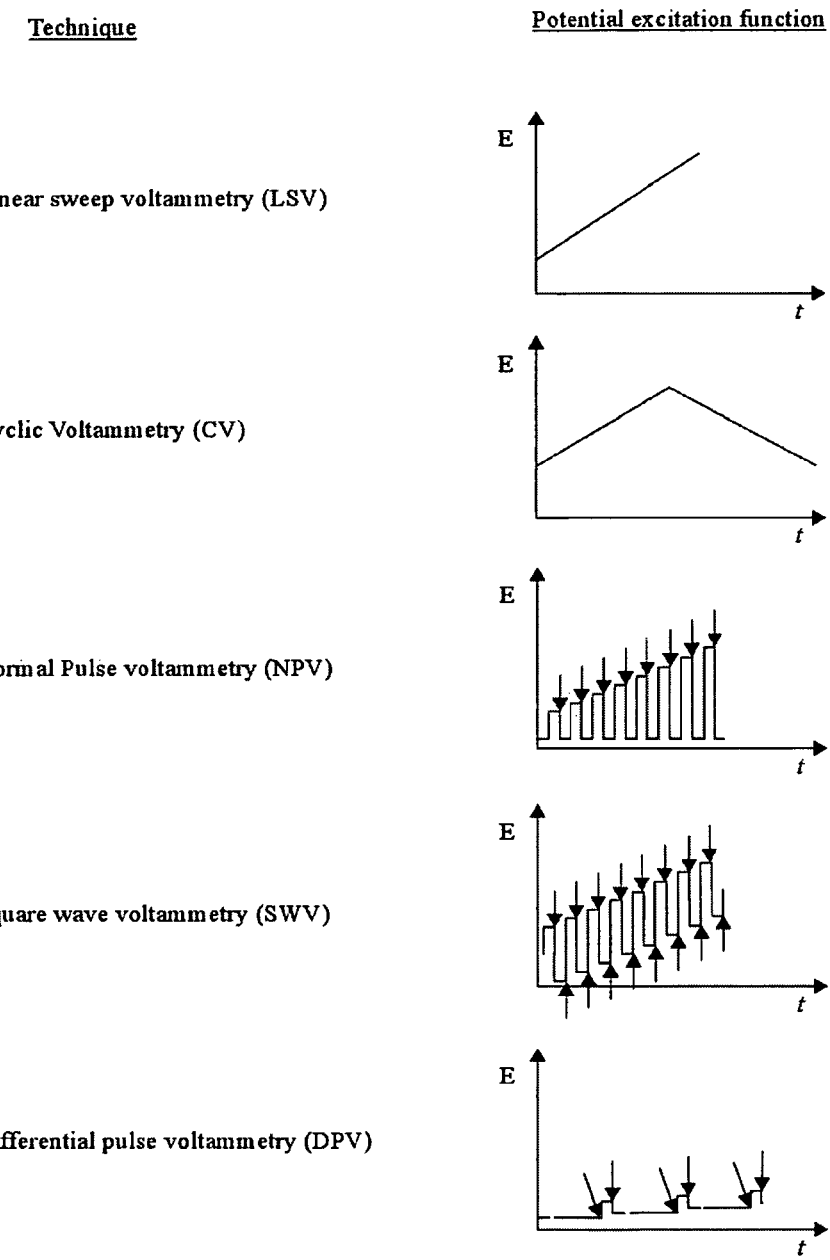
FIG. 25, adapted from [55], depicts examples of common voltammetric techniques in terms of stimulus waveforms shown as excitation potential as a function of time, the arrows therein indicating pints in time where voltammetric measurements can be made.
Figure 26:
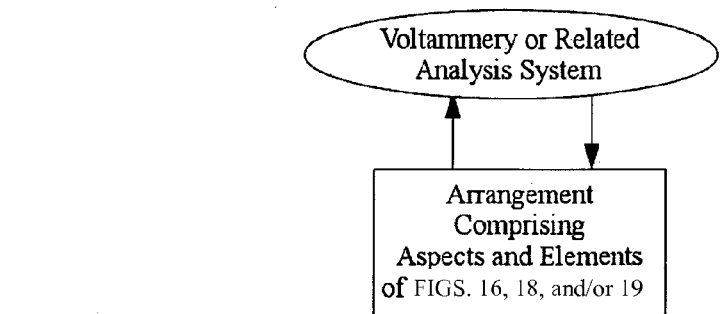
FIG. 26 shows an exemplary cell supplemented with electronics suitable for voltammetry and other related chemical analysis processes.

Voltammetry and coulometry are well-know means for chemical analysis of samples employing electrochemical techniques. FIG. 25, adapted from [55], depicts examples of common voltammetric techniques in terms of stimulus waveforms shown as excitation potential as a function of time, the arrows therein indicating pints in time where voltammetric measurements can be made. FIG. 26 shows an exemplary cell supplemented with electronics suitable for voltammetry and other related chemical analysis processes. More generally, both electrochemical synthesis and electrochemical analysis (for example voltammetry and coulometry) both employ electrodes that can be miniaturized to microfluidic system scales. In some circumstances, it can be advantageous to employ at least one electrode for both electrochemical synthesis and electrochemical analysis.

The electrodes used in electrochemical synthesis, electrochemical analysis, or shared electrochemical synthesis/analysis systems typically connect to various types of electronics. Similarly as described, above light-emitting LED and light-sensing LED arrangement also require associated supporting electronics. In some embodiments such support electronics can be designed to provide all or nearly all of the signal handling, conditioning, and processing required for synthesis or analysis functions. However, in many embodiments the electronics will interface a computing processor (for example an embedded controller or Field-Programmable Logic Array). In an embodiment such a computational element can perform at least some of the signal handling, conditioning, and processing required for synthesis or analysis functions.

Figure 27:
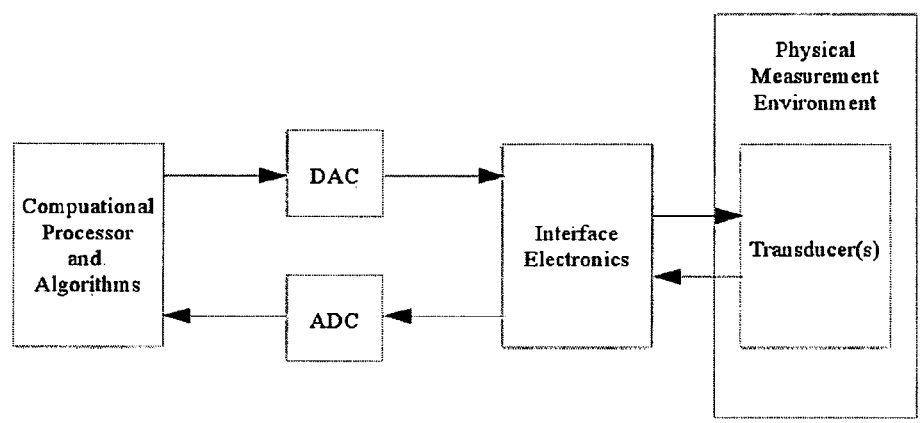
FIG. 27 depicts a measurement system as can be used to implement aspects of diode array detection measurements, voltammetry measurements, coulometry measurements, electrochemical luminescence measurements, etc.

FIG. 27 depicts an exemplary general measurement system as can be used to implement aspects of diode array detection measurements, voltammetry measurements, coulometry measurements, electrochemical luminescence measurements, etc. In an embodiment, support electronics is provided to provide portions or all of the signal handling, conditioning, and processing required for synthesis or analysis functions. In another embodiment, the computational element can perform at least some of the signal handling, conditioning, and processing required for synthesis or analysis functions.

In an aspect of the invention, two or more photochemical and electrochemical processes are simultaneously or sequentially used, leveraging the shared attributes of created excited states and created reactive intermediates, to create methods and systems, these use for chemical analysis.

In an embodiment, a chemical analysis stage comprised by the invention is used to monitor the quality performance of a chemical synthesis stage comprised by the invention.

Control Systems

Figure 28:
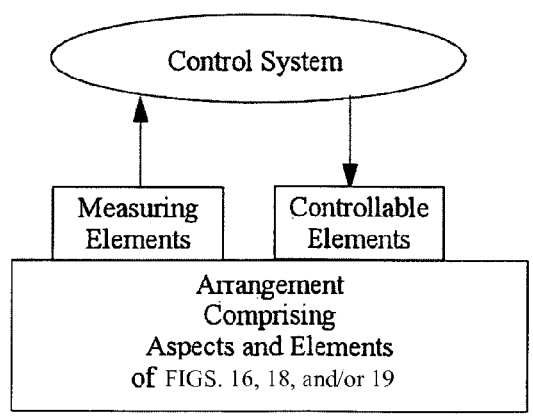
FIG. 28 depicts an exemplary closed-loop process control system arrangement as provided for by the invention.

FIG. 28 shows an exemplary implementation supplemented with a control system. The control system can, for example, control one or more of:

LEDs emitting stimulating radiation for photochemical processes;
Electrodes emitting stimulating electrical potentials or currents for electrochemical processes;
Controllable valves that can be introduced into, among, or at interfaces to the arrangements of FIGS. 16, 18, and 19;
Controllable pumps that can be introduced into, among, or at interfaces to the arrangements of FIGS. 16, 18, and 19;
Controllable thermal systems that can be introduced into, among, or at interfaces to the arrangements of FIGS. 16, 18, and 19;
Overall chemical synthesis processes;
Overall chemical analysis processes.

In an embodiment, each of the controllable items listed above, as well as others, are electrically controllable and thus can be controlled, via electrical and logical connection, by a computational processor (for example an embedded processor, Field Programmable Logic Array, etc.)

In an aspect of the invention, at least one of photochemical, electrochemical, thermal, and flow control processes are implemented and used to provide observational input into a control process or system.

The control system can be provided with measurement signals from, for example, one or more of the following:

Photodetectors for measuring light emissions from photochemical processes;
Ion sensors;
pH sensors;
temperature sensors;
pressure sensors;
flow sensors;
voltage measurement electrodes;
electrical current measurement shunts.

In an aspect of the invention, photochemical and electrochemical measurement processes are implemented and used to provide observational input into a control process or system.

System-Level Aspects of the Invention

Figure 29A:
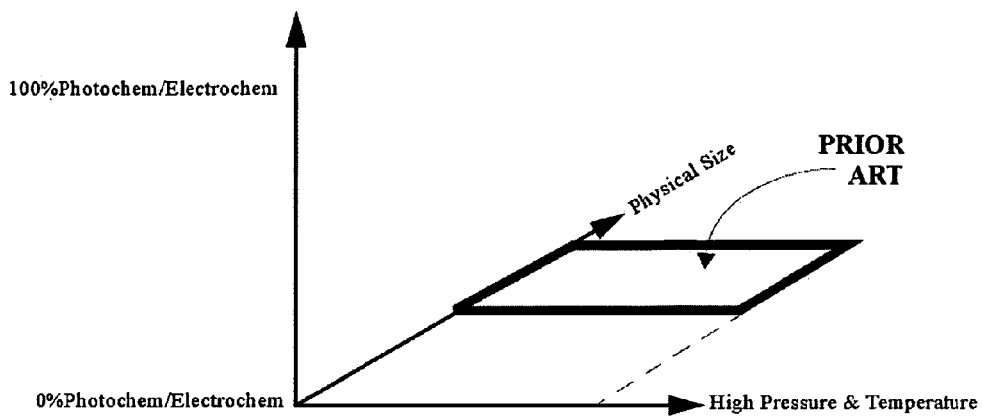
FIG. 29a depicts a region of a technology attribute space that involves high pressures or high temperatures and larger scales of size that have been somewhat addressed by the prior art.
Figure 29B:
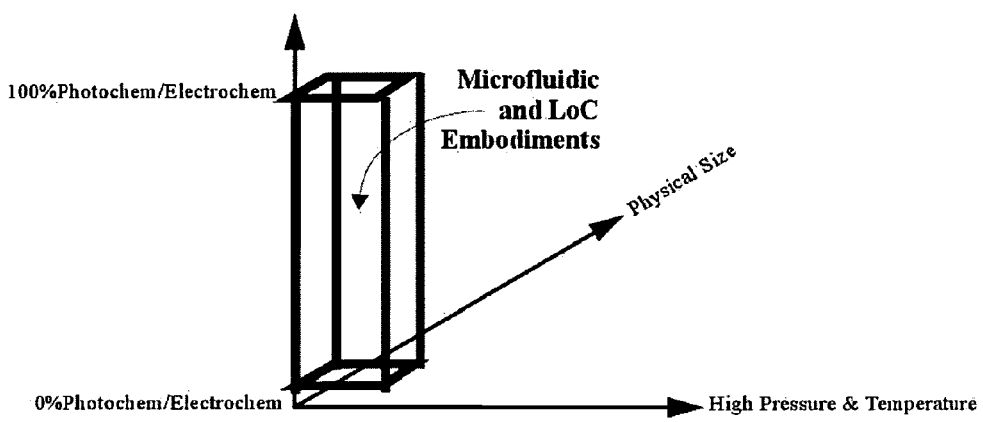
FIG. 29b depicts a region of the technology attribute space relating to microfluidic and lab-on-a-chip embodiments of the invention.
Figure 29C:
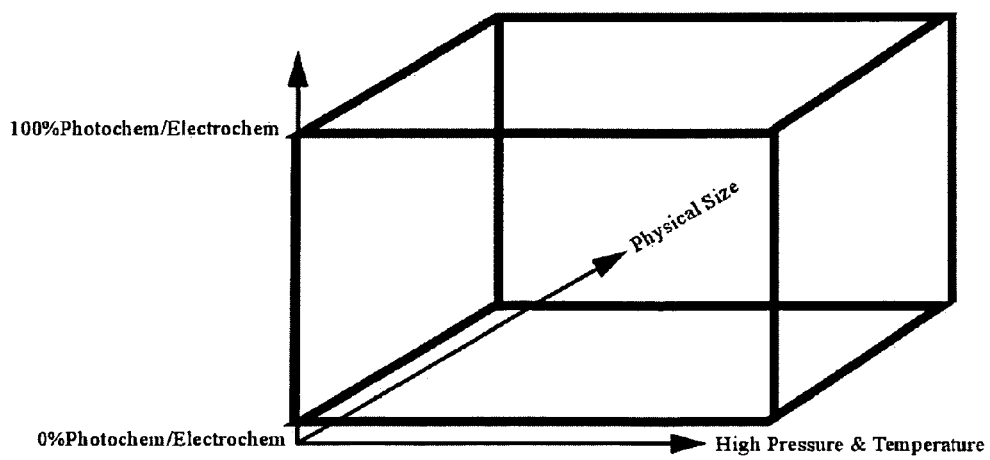
FIG. 29c depicts a region of the technology attribute space relating to more general embodiments of the invention.

Although there are many aspects of microfludic technologies (such as increased surface-to-volume ratio facilitating increased heat transfer rates, more uniform temperature distrubution across cross-sections and volumes, special configurations to support high pressures and superheating, etc.) that provide advantageous handling of high pressures and extreme temperatures (for example as taught in [60]), in general microfluidic and lab-on-a-chip devices are easier to fabricate and can be manufactured at far smaller scales if there are no large pressure differences or temperature differences within the device. FIG. 29a depicts a region of a technology attribute space that involves high pressures or high temperatures and larger scales of size that have been somewhat addressed by the prior art discussed in [60]. In contrast, FIG. 29b depicts a region of the technology attribute space relating to the microfluidic and lab-on-a-chip embodiments of the invention of principle interest in small-scale complex-function systems. Nonetheless, various aspects of the invention can provide value over a wide range of the attributes depicted in FIGS. 29a-29b. Accordingly, FIG. 29c depicts a region of the technology attribute space relating to more general embodiments of the invention.

The invention can provide a wide range of capabilities. In a limited-feature embodiment only a few select capabilities are implemented. Such an embodiment could be designed for either a limited set of functions or for a limited set of tasks. A number of such limited embodiments (identical or different) can be used together (for example, as suggested in looking ahead to FIG. 32) to create a system with greater capabilities. In wide-capability embodiment, a wide range of capabilities are provided and used or not used as needed or advantageous for an application.

Figure 30A:
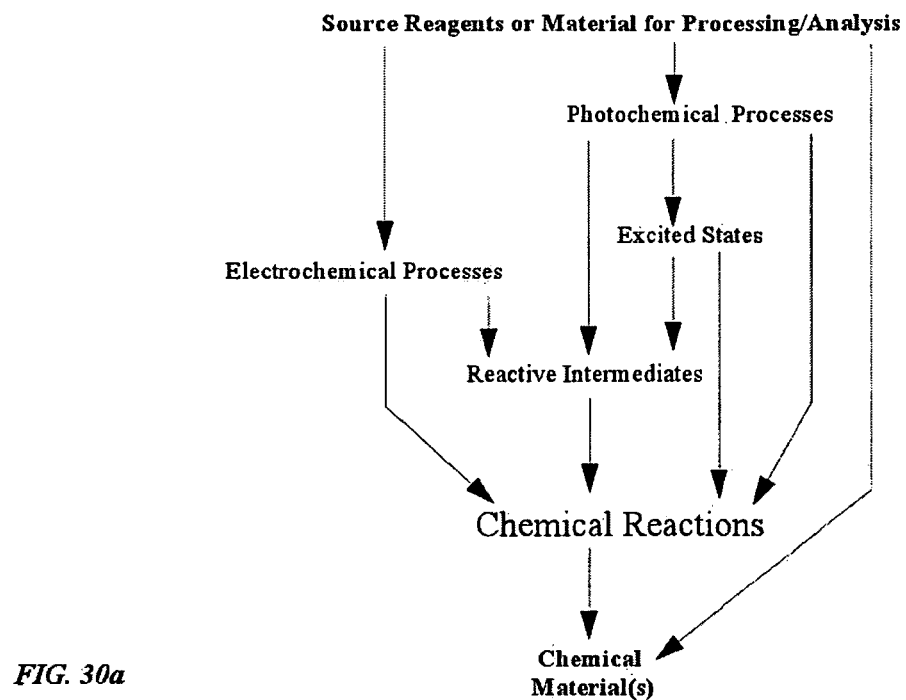
FIG. 30a depicts an exemplary chemical reaction framework as provided for by the invention.
Figure 30B:
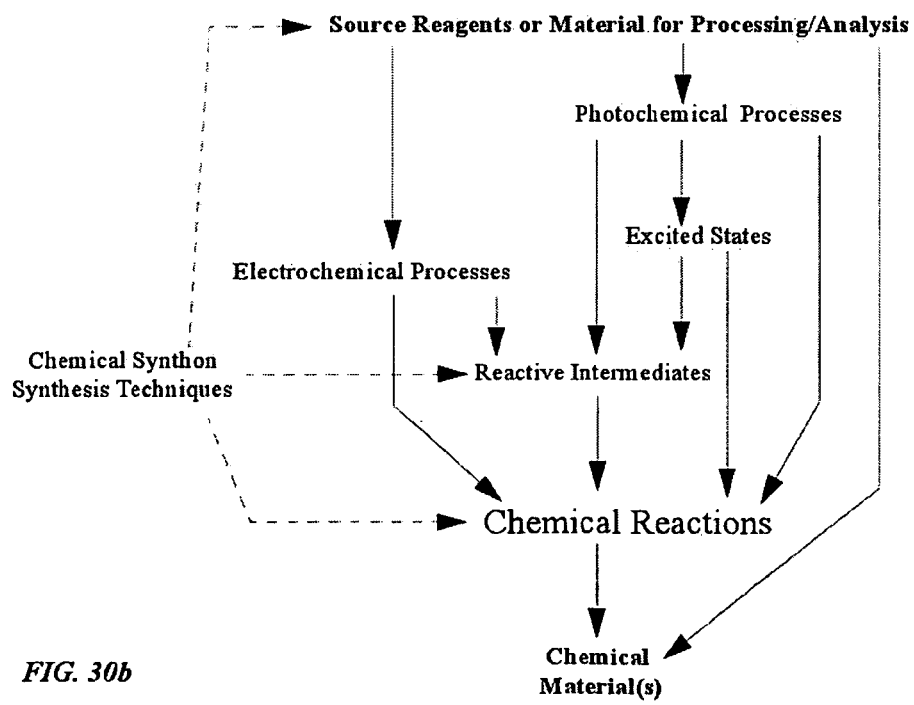
FIG. 30b depicts an extension of the exemplary chemical reaction framework of FIG. 30a to further include synthon synthesis techniques as provided for by the invention.
Figure 30C:
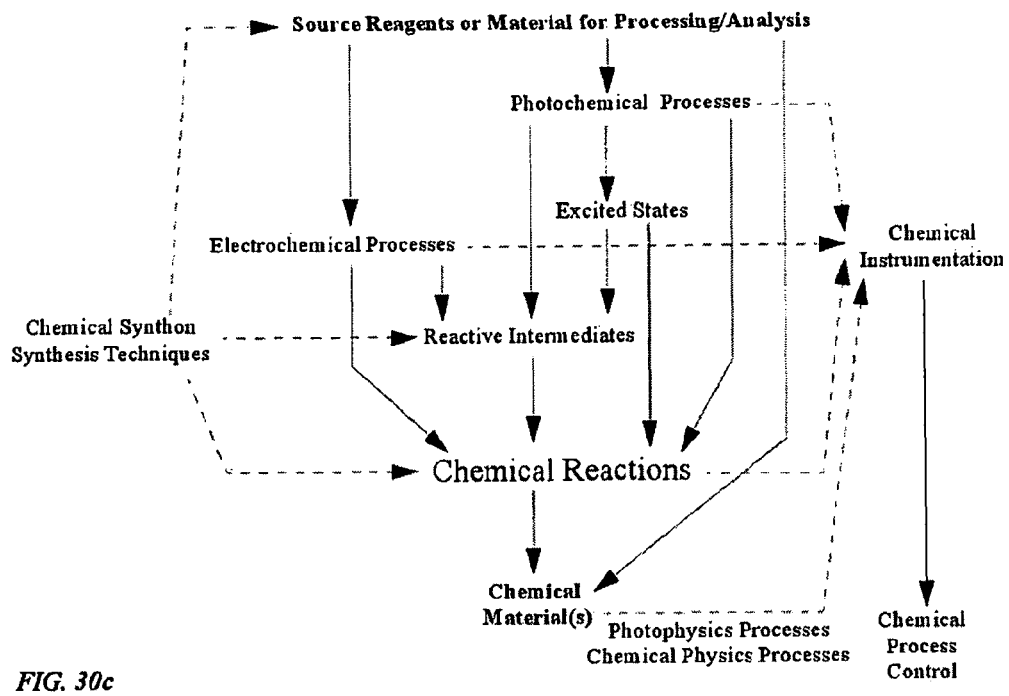
FIG. 30c depicts an extension of the exemplary chemical reaction and synthon framework of FIG. 30b to further include chemical instrumentation and process control as provided for by the invention.
Figure 30D:
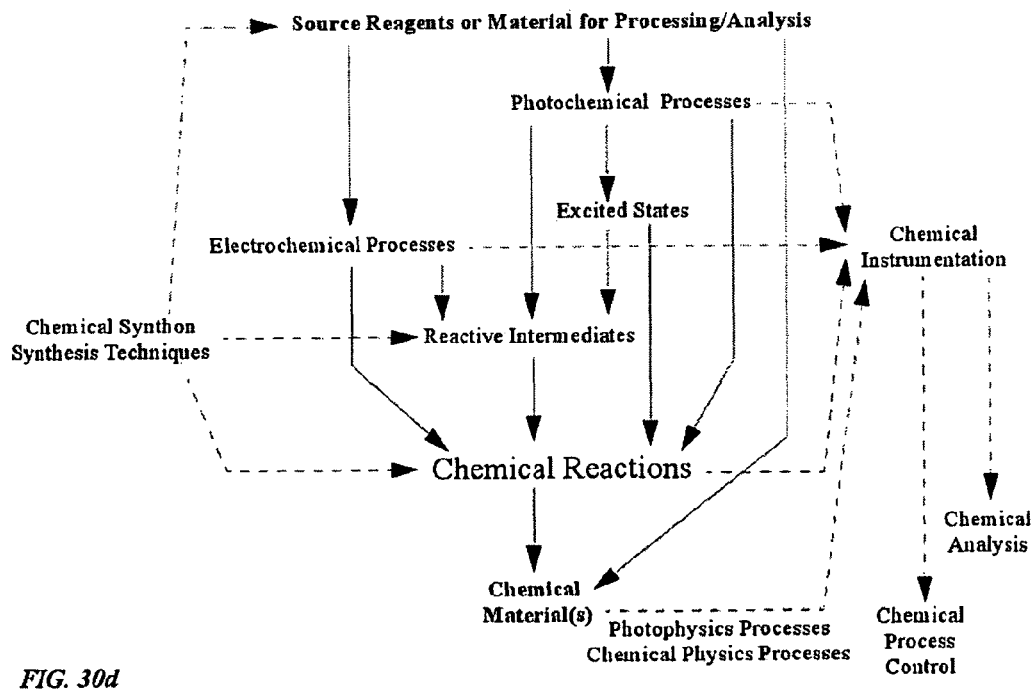
FIG. 30d depicts an extension of the exemplary chemical reaction, synthon chemical instrumentation and process control framework of FIG. 30c to further include chemical analysis as provided for by the invention.
Figure 30E:
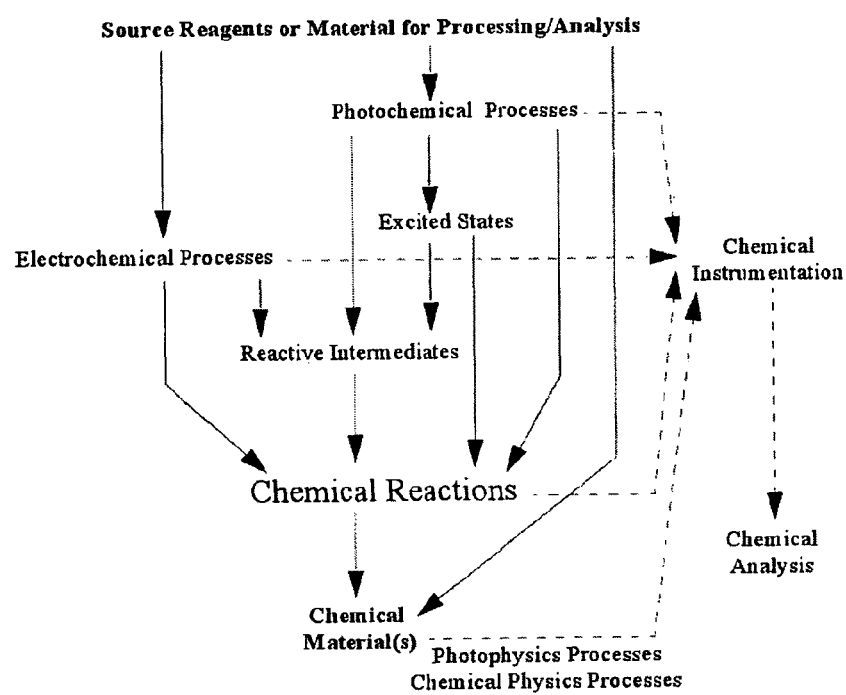
FIG. 30e depicts an extension of the exemplary chemical reaction framework of FIG. Ma to further include chemical instrumentation and chemical analysis as provided for by the invention.

Either in the context of various types of limited-feature embodiments or in the context of wide-capability embodiments where some or all features are selectively used, a number of example operational frameworks are provided by way of illustration. Clearly other combinations can be called out and these provided examples are in no way to be construed as limiting. FIG. 30a depicts an exemplary chemical reaction framework as provided for by the invention. FIG. 30b depicts an extension of the exemplary chemical reaction framework of FIG. 30a to further include synthon synthesis techniques as provided for by the invention. FIG. 30c depicts an extension of the exemplary chemical reaction and synthon framework of FIG. 30b to further include chemical instrumentation and process control as provided for by the invention. FIG. 30d depicts an extension of the exemplary chemical reaction, synthon chemical instrumentation and process control framework of FIG. 30c to further include chemical analysis as provided for by the invention. FIG. 30e depicts an extension of the exemplary chemical reaction framework of FIG. 30a to further include chemical instrumentation and chemical analysis as provided for by the invention.

Figure 31:
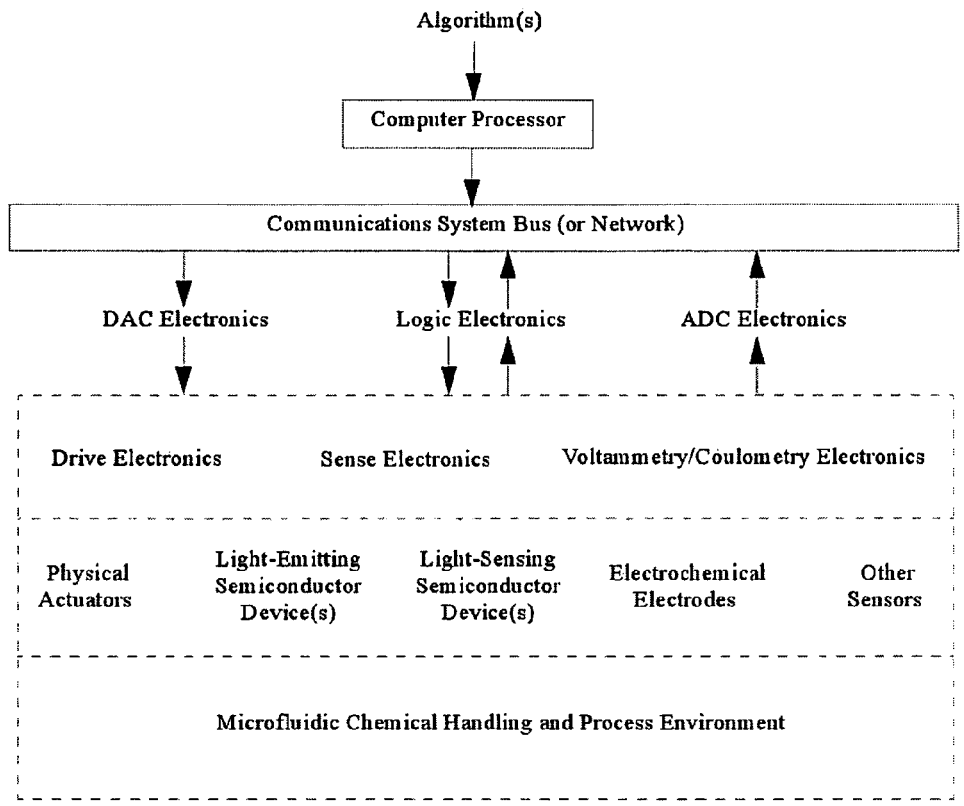
FIG. 31 depicts an exemplary layered functional architecture as provided for by the invention and useful in particular to microfluidic and lab-on-a-chip embodiments.

Although the invention can be realized in various ways, FIG. 31 depicts an exemplary layered functional architecture as provided for by the invention and useful in particular to microfluidic and lab-on-a-chip embodiments. Clearly other realizations are possible and this example in no way to be construed as limiting.

Figure 32:
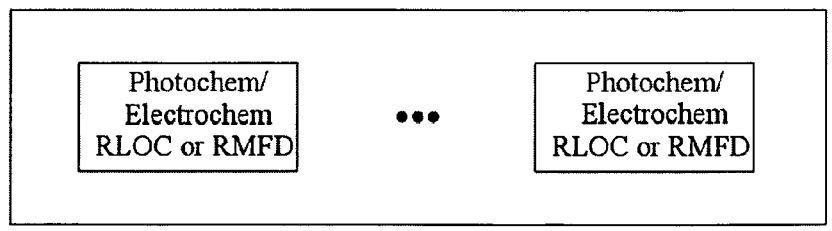
FIG. 32 depicts a larger system or process comprising a plurality of instances of aspects of the invention.

It is noted that larger more complex systems can be created by combining multiple instances of the invention. FIG. 32 depicts a representation of a larger system or process comprising a plurality of instances of aspects of the invention.

Microfluidic and Lab-on-a-Chip Implementations

As mentioned earlier, selected areas of photochemistry and electrochemistry also are easily spatial localized for isolation and readily miniaturized, making them very attractive candidates for implementation within microfluidic and lab-on-a-chip devices and systems employing these devices. In particular, ultramicroelectrodes have been devised for a range of electrochemical processes while LEDs emitting light at photochemical-suitable wavelengths and low-noise photosensing semiconductors responsive to light photochemical-suitable wavelengths are intrinsically small and readily ultraminiturizable. Accordingly, the invention provides for the arrangements of FIGS. 16, 18, and 19 to be readily amenable and applicable to microfluidic and lab-on-a-chip implementations.

Further, controllable valves, pumps, and thermal systems that can be introduced into, among, or at interfaces to the arrangements of FIGS. 16, 18, and 19 are readily amenable and applicable to microfluidic and lab-on-a-chip implementations. Yet further, ion sensors, pH sensors, temperature sensors, pressure sensors, and flow sensors, are readily amenable and applicable to microfluidic and lab-on-a-chip implementations. Electrical current measurement shunts can also readily be implemented microfluidic and lab-on-a-chip realizations, along with sensitive interface electronics.

Additionally, control systems such as the afore described can be added within or external to microfluidic or lab-on-a-chip realizations.

In an aspect of the invention, one or more of the aforedescribed systems and methods are implemented within systems employing the aforementioned microfluidic or lab-on-a-chip devices.

With the addition of sufficient controllable valves, pumps, thermal systems, and sensors, the aforedescribed microfluidic and lab-on-a-chip realizations can be expanded and combined with an enhanced control system so as to implement a Reconfigurable Lab-on-a-Chip (RLOC) device such as that described in pending U.S. patent application Ser. No. 11/946,678. Such a RLOC would provide configuration control as well as process control. Software or scripting languages can be used for configuration specification and process control specification. Such software can be developed using an environment such as that described in pending U.S. patent application Ser. No. 12/328,726. In actual RLOC device or process development, an emulation/simulation environment compatible with the software development system, for example such as that described in pending U.S. patent application Ser. No. 12/328,713. The RLOC device could also include a high-performance multichannel microfluidic chemical transport bus such as that described in pending U.S. patent application Ser. Nos. 11/946,678 and 12/328,716. It is also noted that the systems of methods of RLOC devices described in pending U.S. patent application Ser. No. 11/946,678, which can employed here as described above, are also taught as applying to larger-scale scale implementations such as reconfigurable larger format microfluidic devices.

In an aspect of the invention, one or more of the aforedescribed systems and methods are implemented within a reconfigurable microfluidic or lab-on-a-chip devices. The microfluidic structures permit controlled transport of chemical materials (liquids, gasses, solids, and mixtures of these) among reactors, sensor systems, and input/output ports to the external world and other systems.

It is noted that a reconfigurable microfluidic or lab-on-a-chip device implementation of the arrangements of FIGS. 16, 18, and 19 are readily amenable and applicable to systems and methods for anion relay chemistry, synthon-principle chemistry, or combinational chemistry implementations and processes.

Systems Employing Multiple Microfluidic or Lab-on-a-Chip Implementations

In another aspect of the invention, one or more of the aforedescribed are implemented within systems employing the aforementioned microfluidic or lab-on-a-chip devices. For example, it is also noted that the systems of methods of Reconfigurable Lab-on-a-chip (RLOC) devices described in pending U.S. patent application Ser. No. 11/946,678, which can employed here as described above, are provided with teachings for building larger systems employing the aforementioned microfluidic or lab-on-a-chip devices. FIG. 32 shows an exemplary implementation of a larger system comprising one or more of microfluidic devices and lab-on-a-chip devices.

Laboratory and Specialty-Chemical-Manufacturing Scale Implementations

It is noted that the arrangements of FIGS. 16, 18, and 19 can be implemented with laboratory-scale reaction vessels, insertion devices, etc.

It is also noted that the systems of methods of RLOC devices described in pending U.S. patent application Ser. No. 11/946,678, which can employed here as described above, are also taught as applying to laboratory-scale implementations.

It is further noted that a reconfigurable laboratory-scale implementation of the arrangements of FIGS. 16, 18, and 19 are readily amenable and applicable to systems and methods for one or more of anion relay chemistry, synthon-principle chemistry, and combinational chemistry implementations and processes.

In another aspect of the invention, one or more of the aforedescribed are implemented within laboratory and specialty-chemical-manufacturing scale processes and systems.

Chemical-Plant Scale Implementations

It is noted that the arrangements of FIGS. 16, 18, and 19 can be implemented with chemical-plant-scale elements.

It is also noted that the systems of methods of RLOC devices described in pending U.S. patent application Ser. No. 11/946,678, which can employed here as described above, are also taught as applying to larger-scale implementations such as chemical plants.

In another aspect of the invention, one or more of the aforedescribed are implemented within a chemical plant.

Although exemplary embodiments have been provided in detail, various changes, substitutions and alternations could be made without departing from spirit and scope of the disclosed subject matter as defined by the appended claims. Variations described for exemplary embodiments may be realized in any combination desirable for each particular application. Thus particular limitations, and embodiment enhancements described herein, which may have particular advantages to a particular application, need not be used for all applications. Also, not all limitations need be implemented in methods, systems, and apparatuses including one or more concepts described with relation to the provided exemplary embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

Although exemplary embodiments have been provided in detail, it should be understood that various changes, substitutions and alternations could be made thereto without departing from spirit and scope of the disclosed subject matter as defined by the appended claims. Variations described for exemplary embodiments may be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to the provided exemplary embodiments.

REFERENCES

[1] T. Clark; R. Koch, *The Chemist's Electronic Book of Orbitals*, Springer, 1999.
[6] Wikipedia, "Reactive Intermediate," http://en.wikipedia.org/wiki/Reaction intermediate, (accessed Jan. 23, 2010).
[10] C. Wayne; R. Wayne, *Photochemistry*, Oxford University Press, New York, 1996.
[11] R. Ponec, *Overlap Determinant Method in the Theory of Pericyclic Reactions*, Springer, 1995.
[16] C. Willis; M. Wills, *Organic Synthesis*, Oxford University Press, 1995.
[15] M. Robin, *Higher Excited States of Polyatomic Molecules*, Vol. III, Academic Press, Orlando, 1985.
[17] F. Ansari, R. Qureshi, M. Qureshi, Electrocyclic Reactions, Wiley-VCH, Weinham, 1999.
[18] Answers.com, "Photochemistry," http://www.answers.com/topic/photochemistry, accessed Feb. 7, 2010.
[19] Kalyanasundaram, K., *Photochemistry in Microheterogenous Systems*, Academic Press, 1987.
[20] V. Balzani, G. Bergamini, S. Campagna, F. Puntoriero, "Photochemistry and Photophysics of Coordination Compounds: Overview and general Concepts," in *Photochemistry and Photophysics of Coordination Compounds I, Topics of Current Chemistry* Vol. 280, Springer, 2007
[23] Coyle, J., *Introduction to Organic Photochemistry*, Wiley, 1986.
[55] A. Kaifer; M. Gomex-Kaifer, Supramolecular Electrochemistry, Wiley-VCH, 1999.
[60] P. Laurino, A. Odedra, X. Mak, T. Gustafsson, K. Geyer, P. Seeberger, "Microfluidic Devices for Organic Processes," *Chemical Reactions and Processes Under Flow Conditions* (*RSC Green Chemistry No.* 5), S. Luis and E. Garcia-Verdugo, eds., Royal Society of Chemistry, 2010.

I claim:

1. A microfluidic system comprising a plurality of photochemical reaction stages, the microfluidic system comprising:
   a computational processor for executing an algorithm;
   a plurality of electrically-controllable photochemical reaction stages connected in series; and
   a series of controllable interconnections for connecting the electrically-controllable photochemical reaction stages;
   the algorithm executed by the computational processor to control the plurality of electrically-controllable photochemical reaction stages and the controllable interconnections to perform a plurality of reactions in sequence.

2. The microfluidic system of claim 1 wherein each of the electrically controllable photochemical reaction stages further comprises at least one Light Emitting Diode (LED) configured to create an associated photochemical reaction.

3. The microfluidic system of claim 2 wherein the at least one Light Emitting Diode (LED) is configured to emit light comprising a visible wavelength.

4. The microfluidic system of claim 2 wherein the at least one Light Emitting Diode (LED) is configured to emit light comprising an ultraviolet wavelength.

5. The microfluidic system of claim 2 wherein the at least one Light Emitting Diode (LED) is configured to emit light comprising an infrared wavelength.

6. The microfluidic system of claim 2 wherein the at least one Light Emitting Diode (LED) interfaces with the computational processor.

7. The microfluidic system of claim 2 wherein the at least one Light Emitting Diode (LED) is configured to be controlled by the computational processor.

8. The microfluidic system of claim 1 further comprising at least one valve controlled by the computational processor.

9. The microfluidic system of claim 1 further comprising at least one pump controlled by the computational processor.

10. The microfluidic system of claim 1 further comprising at least one sensor, the sensor for providing a signal to the computational processor.

11. The microfluidic system of claim 1 further comprising at least photosensitizer.

* * * * *